(12) United States Patent
Aragon et al.

(10) Patent No.: US 11,430,228 B2
(45) Date of Patent: Aug. 30, 2022

(54) DYNAMIC DRIVING METRIC OUTPUT GENERATION USING COMPUTER VISION METHODS

(71) Applicant: Allstate Insurance Company, Northbrook, IL (US)

(72) Inventors: Juan Carlos Aragon, Redwood City, CA (US); Regina Madigan, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/079,851

(22) Filed: Oct. 26, 2020

(65) Prior Publication Data

US 2021/0042538 A1 Feb. 11, 2021

Related U.S. Application Data

(63) Continuation of application No. 16/142,696, filed on Sep. 26, 2018, now Pat. No. 10,817,729.

(51) Int. Cl.
*H04N 5/232* (2006.01)
*G06V 20/56* (2022.01)
(Continued)

(52) U.S. Cl.
CPC ............ *G06V 20/588* (2022.01); *G06T 7/246* (2017.01); *G06T 7/50* (2017.01); *G06T 7/80* (2017.01);
(Continued)

(58) Field of Classification Search
CPC . G06T 2207/10016; G06T 2207/30204; G06T 2207/30244; G06T 2207/30256;
(Continued)

(56) References Cited

U.S. PATENT DOCUMENTS 8,107,083 B2 1/2012 Bendall et al.
9,401,028 B2 * 7/2016 Kuehnle ............ G06K 9/00798
(Continued)

OTHER PUBLICATIONS

K. Ghazali, R. Xiao and J. Ma, "Road Lane Detection Using H-Maxima and Improved Hough Transform", Fourth International Conference on Computational Intelligence, Modelling and Simulation, pp. 205-208, 2012.
(Continued)

*Primary Examiner* — Md N Haque
(74) *Attorney, Agent, or Firm* — Polsinelli PC

(57) ABSTRACT

Aspects of the disclosure relate to dynamic driving metric output platforms that utilize improved computer vision methods to determine vehicle metrics from video footage. A computing platform may receive video footage from a vehicle camera. The computing platform may determine that a reference marker in the video footage has reached a beginning and an end of a road marker based on brightness transitions, and may insert time stamps into the video accordingly. Based on the time stamps, the computing platform may determine an amount of time during which the reference marker covered the road marking. Based on a known length of the road marking and the amount of time during which the reference marker covered the road marking, the computing platform may determine a vehicle speed. The computing platform may generate driving metric output information, based on the vehicle speed, which may be displayed by an accident analysis platform. Based on known dimensions of pavement markings the computing platform may obtain the parameters of the camera (e.g., focal length, camera height above ground plane and camera tilt angle) used to generate the video footage and use the camera parameters to determine the distance between the camera and any object in the video footage.

19 Claims, 28 Drawing Sheets

(51) Int. Cl.
  *G06T 7/246* (2017.01)
  *H04N 5/265* (2006.01)
  *G06T 7/80* (2017.01)
  *G06T 7/50* (2017.01)
  *G07C 5/00* (2006.01)
  *G07C 5/08* (2006.01)

(52) U.S. Cl.
  CPC ........... *G07C 5/008* (2013.01); *G07C 5/0808* (2013.01); *H04N 5/23206* (2013.01); *H04N 5/265* (2013.01); *G06T 2207/10016* (2013.01); *G06T 2207/30204* (2013.01); *G06T 2207/30244* (2013.01); *G06T 2207/30256* (2013.01)

(58) Field of Classification Search
  CPC .. G06T 7/246; G06T 7/50; G06T 7/80; H04N 5/23206; H04N 5/265
  See application file for complete search history.

(56) References Cited

U.S. PATENT DOCUMENTS

| | | | |
|---|---|---|---|
| 9,524,269 | B1 | 12/2016 | Brinkmann et al. |
| 9,535,878 | B1 | 1/2017 | Brinkmann et al. |
| 9,892,573 | B1 | 2/2018 | Hsu-Hoffman et al. |
| 10,445,758 | B1* | 10/2019 | Bryer ..................... G06Q 40/08 |
| 10,853,942 | B1* | 12/2020 | Boyd .................... G05D 1/0094 |
| 2011/0273565 | A1 | 11/2011 | Muramatsu et al. |
| 2014/0267688 | A1* | 9/2014 | Aich ................. B60W 50/0097 348/113 |
| 2016/0350921 | A1* | 12/2016 | Bataller ............. G06K 9/00771 |
| 2017/0059712 | A1 | 3/2017 | Yates et al. |
| 2017/0116488 | A1* | 4/2017 | Patander .............. G06K 9/6269 |
| 2019/0043273 | A1 | 2/2019 | Cordova et al. |
| 2019/0356885 | A1 | 11/2019 | Ribeiro et al. |

OTHER PUBLICATIONS

F. Mariut, C. Fosalau and D. Petrisor, "Lane Mark Detection Using Hough Transform", In IEEE International Conference and Exposition on Electrical and Power Engineering, pp. 871-875, 2012.

Aug. 19, 2019—U.S. Non-Final Office Action—U.S. Appl. No. 16/142,696.

Oct. 28, 2019 (WO) International Search Report and Written Opinion—App. PCT/US2019/052610.

Jan. 17, 2020—U.S. Final Office Action—U.S. Appl. No. 16/142,696.

Jun. 25, 2020—U.S. Notice of Allowance—U.S. Appl. No. 16/142,696.

* cited by examiner

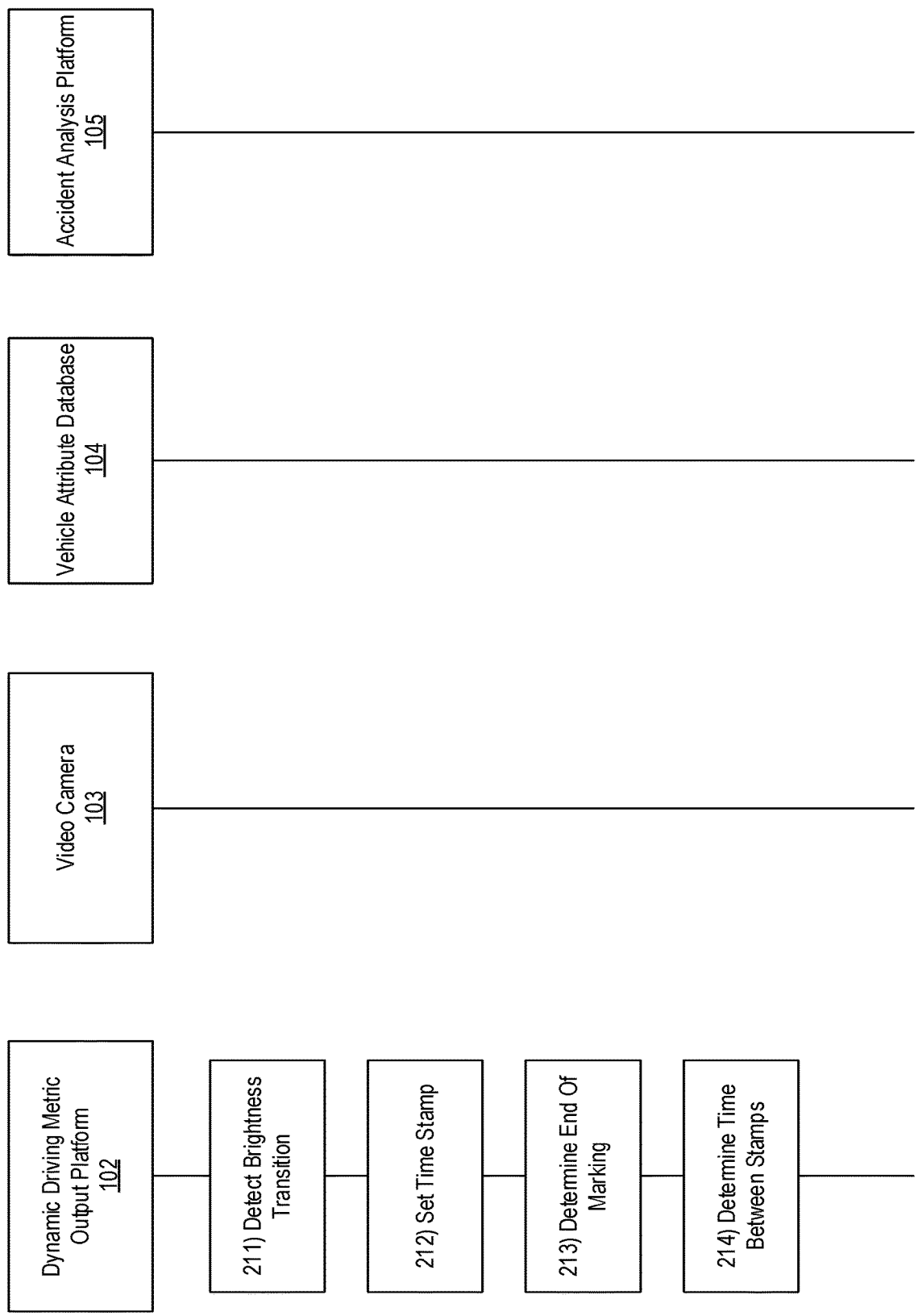

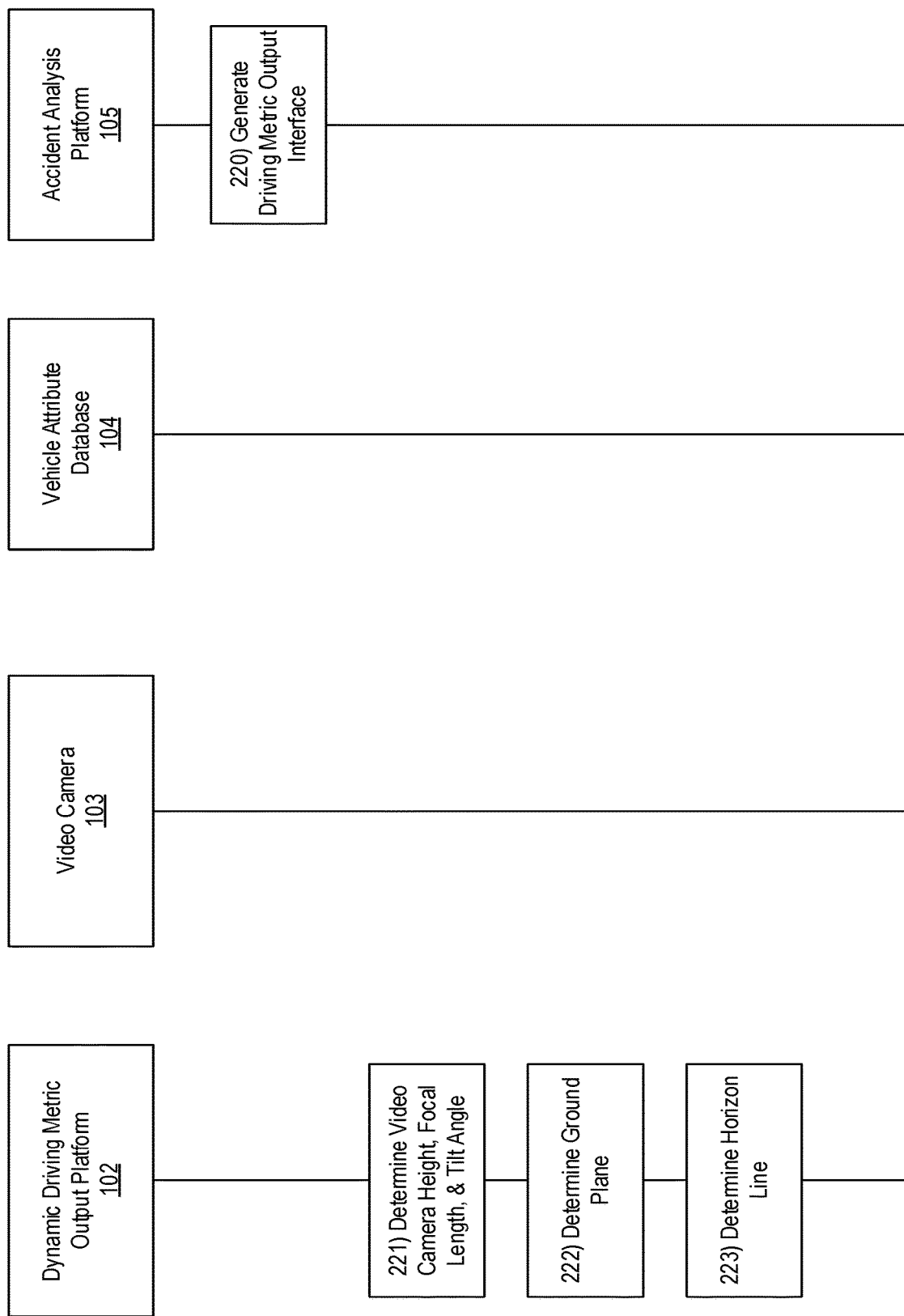

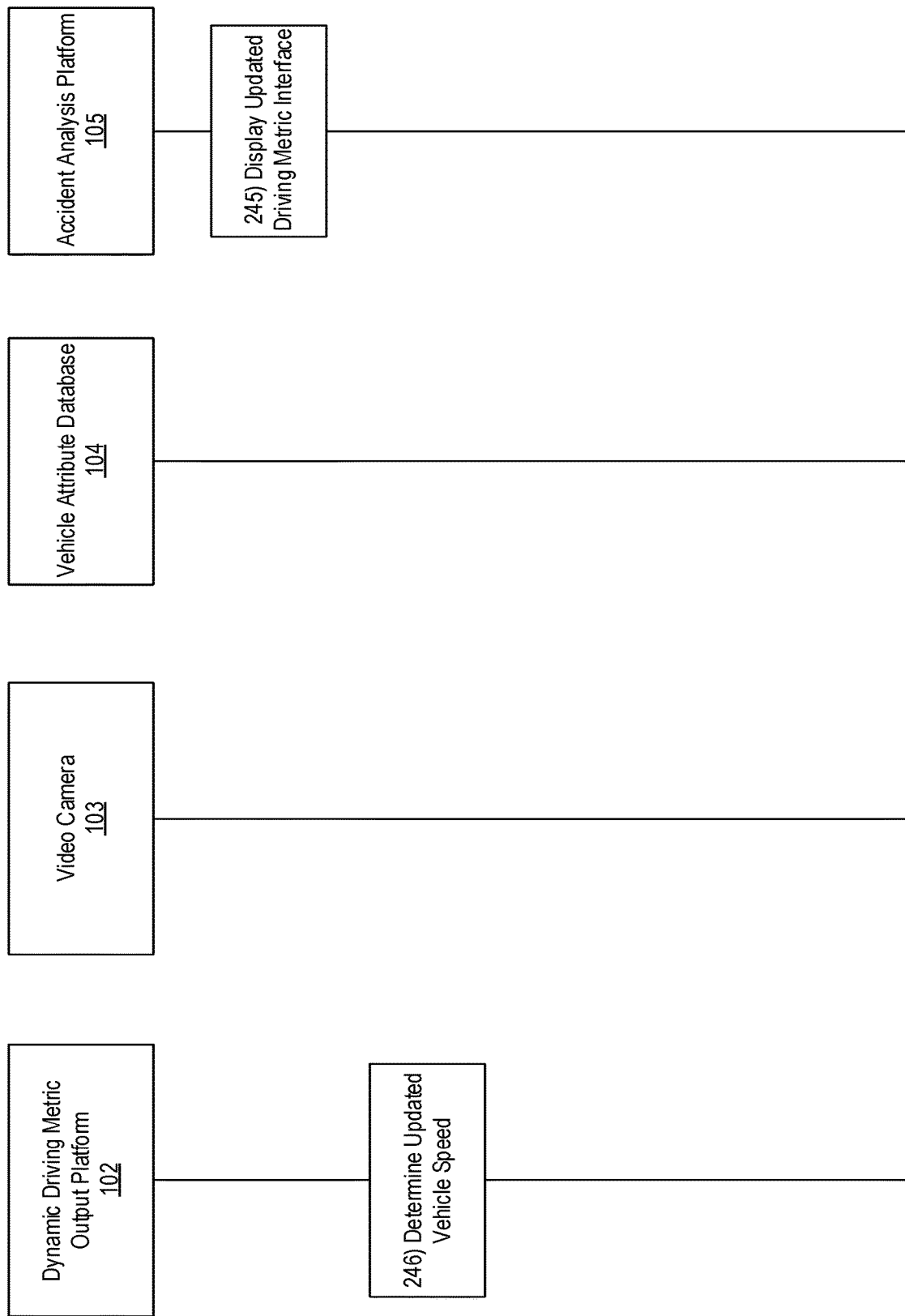

305

310

605

Driving Metric Output Interface

Time Elapsed: 5 minutes 13 seconds

Speed: 65 mph

Acceleration: 2 m/s²

Driving Metric Output Interface

Distance to Vehicle in Left Lane: 30 Feet

FIG. 16

DYNAMIC DRIVING METRIC OUTPUT GENERATION USING COMPUTER VISION METHODS

CROSS-REFERENCE TO RELATED APPLICATIONS

The present application is a continuation of U.S. Ser. No. 16/142,696 filed on Sep. 26, 2018, and entitled "Dynamic Driving Metric Output Generation Using Computer Vision Methods," which is hereby incorporated by reference as to its entirety.

BACKGROUND

Aspects of the disclosure relate to enhanced processing systems for providing dynamic driving metric outputs using improved computer vision methods. In particular, one or more aspects of the disclosure relate to dynamic driving metric output platforms that utilize video footage to compute driving metrics.

Many organizations and individuals rely on vehicle metrics such as speed and acceleration to perform driving and/or accident evaluations. In many instances, however, a vehicle may be equipped with an array of sensors, which include cameras and sensors such as LIDAR and radar, and thus all the speeds and distances are obtained from these sensors. This situation may present limitations to those without access to a fully equipped vehicle with cameras, LIDAR and radar that can capture the important distance, speed and acceleration metrics. There remains an ever-present need to develop alternative solutions to calculate vehicle metrics.

SUMMARY

Aspects of the disclosure provide effective, efficient, scalable, and convenient technical solutions that address and overcome the technical problems associated with determining driving metrics from video captured by a vehicle camera by implementing advanced computer vision methods and dynamic driving metric output generation. In accordance with one or more arrangements discussed herein, a computing platform having at least one processor, a communication interface, and memory may receive video footage from a vehicle camera. The computing platform may determine that a reference marker in the video footage has reached a beginning of a road marking by determining that a first brightness transition in the video footage exceeds a predetermined threshold. In response to determining that the reference marker has reached the beginning of the road marking, the computing platform may insert, into the video footage, a first time stamp indicating a time at which the reference marker reached the beginning of the road marking. The computing platform may determine that the reference marker has reached an end of the road marking by determining that a second brightness transition in the video footage exceeds the predetermined threshold. In response to determining that the reference marker has reached the end of the road marking, the computing platform may insert, into the video footage, a second time stamp indicating a time at which the reference marker reached the end of the road marking. Based on the first time stamp and the second time stamp, the computing platform may determine an amount of time during which the reference marker covered the road marking. Based on a known length of the road marking and the amount of time during which the reference marker covered the road marking, the computing platform may determine a vehicle speed. Based on the vehicle speed, the computing platform may generate driving metric output information. The computing platform may generate one or more commands directing an accident analysis platform to generate and cause display of a driving metric interface based on the driving metric output information. The computing platform may establish a first wireless data connection with the accident analysis platform. While the first wireless data connection is established, the computing platform may send, to the accident analysis platform, the driving metric output information and the one or more commands directing the accident analysis platform to generate and cause display of the driving metric interface based on the driving metric output information. In some arrangements, the computing platform may establish a second wireless data connection with a vehicle camera, wherein the video footage is received while the second wireless data connection is established.

In some arrangements, the computing platform may establish a second wireless data connection with a vehicle camera, wherein the video footage is received while the second wireless data connection is established. In some arrangements, the computing platform may cause the computing platform to determine that the video footage contains a road marking associated with a standard length.

In some arrangements, the computing platform may insert, into the video footage, a reference marker, wherein the reference marker corresponds to a fixed position in the video footage. In some arrangements, the computing platform may generate one or more commands directing a vehicle attribute database to provide vehicle parameters for a vehicle corresponding to the vehicle camera. The computing platform may establish a third wireless data connection with the vehicle attribute database. While the third wireless data connection is established, the computing platform may send the one or more commands directing the vehicle attribute database to provide the vehicle parameters.

In some arrangements, the computing platform may receive a vehicle parameter output corresponding to the vehicle parameters. Based on the vehicle parameters and the distance between the vehicle camera and an object in the video footage, the computing platform may determine a distance between the vehicle and the object in the video footage.

In some arrangements, the computing platform may update the driving metric output information based on the distance between the vehicle and the object in the video footage. The computing platform may generate one or more commands directing the accident analysis platform to generate and cause display of an updated driving metric interface based on the updated driving metric output information. While the first wireless data connection is established, the computing platform may send, to the accident analysis platform, the updated driving metric output information and the one or more commands directing the accident analysis platform to generate and cause display of the updated driving metric interface based on the updated driving metric output information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence deploying a dynamic driving metric output platform that utilizes improved computer vision methods in accordance with one or more example arrangements discussed herein;

FIG. 6 depicts a graphical user interface for a dynamic driving metric output platform that utilizes improved computer vision methods in accordance with one or more example arrangements discussed herein;

FIG. 16 depicts a graphical user interface for a dynamic driving metric output platform that utilizes improved computer vision methods in accordance with one or more example arrangements discussed herein;

DETAILED DESCRIPTION

Figure 1A:
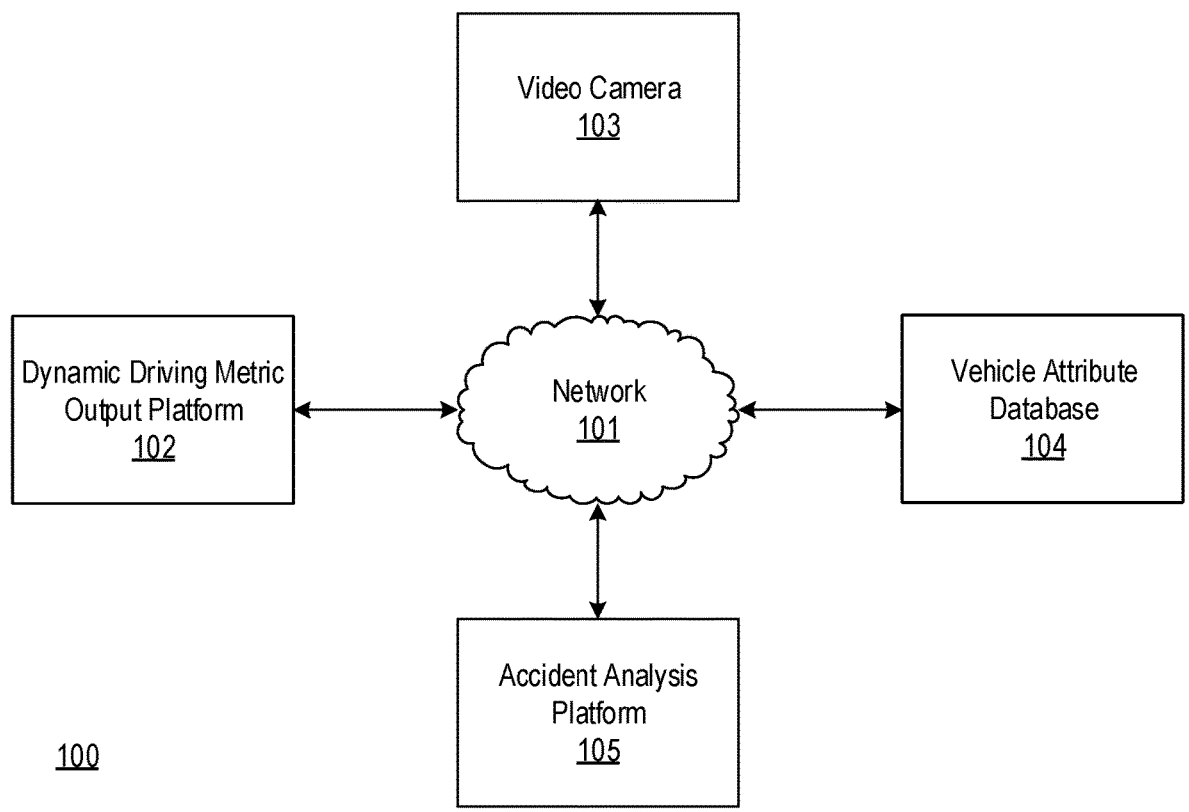
FIGS. 1A-1B depict an illustrative computing environment for deploying a dynamic driving metric output platform that utilizes improved computer vision methods in accordance with one or more example arrangements discussed herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One of the current limitations faced by researchers in the autonomous vehicle industry is the fact that the models they develop for risk prediction, driver behavior prediction, driver frustration estimation, and others may require metrics related to the driving scenario, which might not be readily available on the multitude of driving video datasets available on the Internet. Among the critical metrics that characterize any driving scenario there are the absolute speed of the driver's vehicle (which may be called the ego-vehicle), the relative speed of neighbor vehicles, the distance from the ego-vehicle to all the surrounding vehicles, the acceleration of the ego-vehicle, and the accelerations of all the neighbor vehicles. These metrics may define the mechanics of the interactions among the agents involved on the scenario and thus may be of the utmost importance for modeling, estimation and prediction. All the metrics mentioned may be obtained and derived from the absolute speed of the ego-vehicle and from the distance between the ego vehicle to all the neighbor vehicles.

What is common practice today in industry is to equip a vehicle with an array of sensors which include cameras and sensors such as LIDAR and radar, and thus all the speeds and distances are obtained from these sensors. This situation presents limitations to researchers in academia and industry because not all of them may have the ability and the funding to get access to a fully equipped vehicle with cameras, LIDAR and radar that can capture the important distance, speed and acceleration metrics. For the cases where the researcher can use a fully equipped vehicle, the amount of information that may be collected comes at a cost since it may take time to perform the drive-runs, which is another limitation.

The present disclosure provides a method to overcome these limitations by allowing the extraction of the driving scenario's principal metrics from the existing datasets of recorded driving video. The described method offers the advantage that the metrics may be extracted from the video data only, without any other sensor data such as LIDAR, or radar. Therefore, just the driving video may be sufficient.

One of the roadblocks that prevents the ability to extract this information is the fact that for video coming from existing datasets the information about the camera parameters that were used to record the multitude of videos might not be available. In this case, critical camera parameter information may be the focal length and the height above the ground plane at which the camera was mounted. The present disclosure provides a method that may allow determination of speed and distances without a priori knowledge of these camera parameters. Therefore, this may unlock many possibilities since there is a great deal of driving data available that may be tapped not only to validate models but also to train them. Additionally, the method described allows the real-time deployment of models for prediction and estimation at low cost and with simplicity since the input data for the distance, speed, and acceleration metrics comes only from the camera and does not implement LIDAR and radar equipment.

Figure 1B:
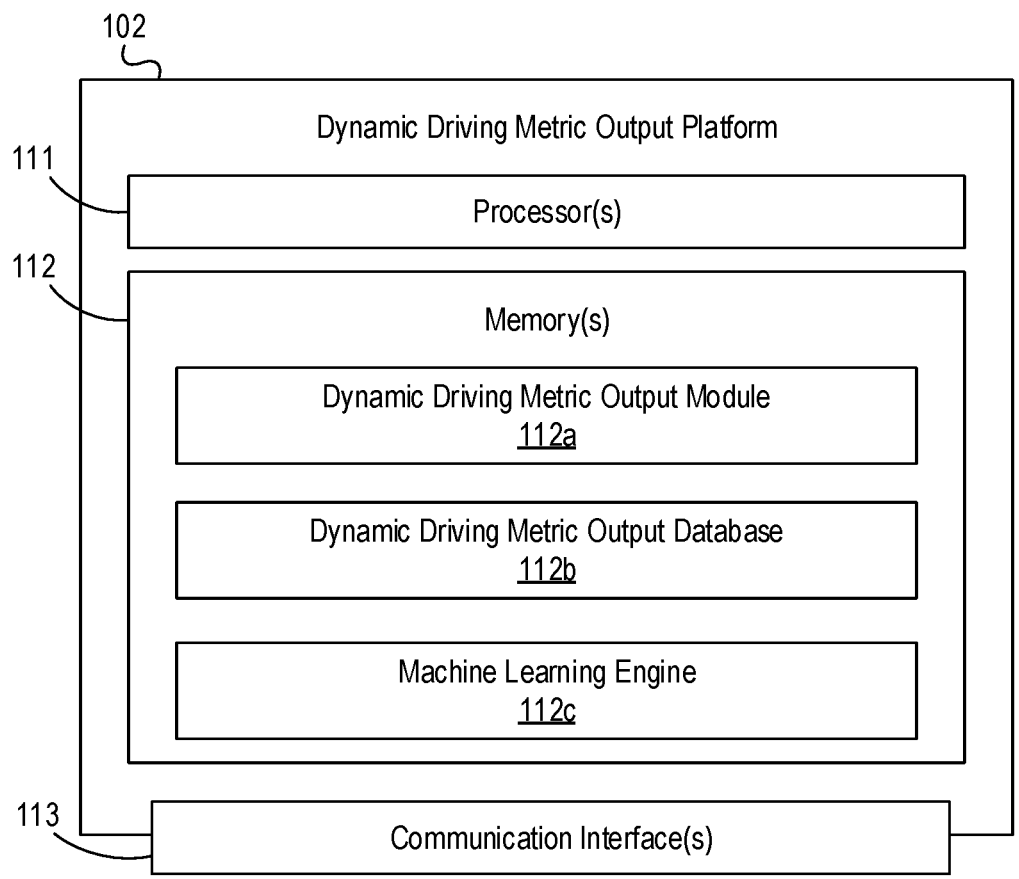

FIGS. 1A-1B depict an illustrative computing environment for deploying a dynamic driving metric output platform 102 that utilizes improved computer vision methods in accordance with one or more example embodiments. Referring to FIG. 1A, computing environment 100 may include one or more computer systems. For example, computing environment 100 may include a dynamic driving metric output platform 102, a video camera 103, a vehicle attribute database 104, and an accident analysis platform 105.

As illustrated in greater detail below, dynamic driving metric output platform 102 may include one or more computing devices configured to perform one or more of the functions described herein. For example, dynamic driving metric output platform 102 may include one or more computers (e.g., laptop computers, desktop computers, servers, server blades, or the like) configured to receive video footage and generate driving metric outputs based on the video.

In addition, and as illustrated in greater detail below, the dynamic driving metric output platform 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by dynamic driving metric output platform 102 may be associated with an external portal provided by an organization, such as an accident analysis portal provided by an insurance institution or provider.

Video camera 103 may be a vehicle camera or a camera on a personal computing device (e.g., smartphone, personal digital assistant, tablet computer, or the like). In some instances, the video camera 103 may be a forward facing camera, a rear facing camera, and or a side facing camera. In some instances, there may be more than one camera. For example, video footage may be captured using a dash board vehicle camera and a camera on a mobile device. In some instances, the video camera 103 may be mounted in the vehicle and may rotate automatically or manually. Although computing environment 100 as shown includes a single video camera 103, it should be understood that the computing environment 100 may include any number of video cameras similar to video camera 103. In some instances, the video camera may be mounted in the vehicle above the dashboard so that the camera has visibility to a scene in front of the vehicle.

Vehicle attribute database 104 may be a computing platform capable of storing and maintaining attributes (e.g., operating parameters, dimensions, or the like) corresponding to various vehicles. In some instances, the vehicle attribute database 104 may be configured to receive requests for vehicle attributes from the dynamic driving metric output platform, determine the corresponding attributes, and send the attributes to the dynamic driving metric output platform 102.

Accident analysis platform 105 may be a computing device (e.g., a desktop computer, laptop computer, tablet computer, smart phone, or the like) that may be used to receive driving metric outputs from the dynamic driving metric output platform 102 and to cause display of the driving metrics outputs. For example, the accident analysis platform 105 may be used by an employee of an insurance institution to analyze driving quality and/or to perform accident evaluation. Accident Analysis Platform may run on-board the vehicle and the results of the models processed by this platform can be available to the driver on board without requiring a network connection.

In addition, and as illustrated in greater detail below, the accident analysis platform 105 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by accident analysis platform 105 may be associated with an external portal provided by an organization, such as an accident analysis portal provided by an insurance institution or provider.

Computing environment 100 also may include one or more networks, which may interconnect one or more of dynamic driving metric output platform 102, video camera 103, vehicle attribute database 104, accident analysis platform 105. For example, computing environment 100 may include a network 101 (which may, e.g., interconnect dynamic driving metric output platform 102, video camera 103, vehicle attribute database 104, and accident analysis platform 105).

In one or more arrangements, dynamic driving metric output platform 102, video camera 103, vehicle attribute database 104, accident analysis platform 105, and/or the other systems included in computing environment 100 may be any type of computing device capable of receiving a user interface, receiving input using the user interface, and communicating the received input to one or more other computing devices. For example, dynamic driving metric output platform 102, video camera 103, vehicle attribute database 104, accident analysis platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic driving metric output platform 102, video camera 103, vehicle attribute database 104, and accident analysis platform 105 may, in some instances, be special-purpose computing devices configured to perform specific functions.

Referring to FIG. 1B, dynamic driving metric output platform 102 may include one or more processors 111, memory 112, and communication interface 113. A data bus may interconnect processor 111, memory 112, and communication interface 113. Communication interface 113 may be a network interface configured to support communication between dynamic driving metric output platform 102 and one or more networks (e.g., network 101, or the like). Memory 112 may include one or more program modules having instructions that when executed by processor 111 cause dynamic driving metric output platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic driving metric output platform 102 and/or by different computing devices that may form and/or otherwise make up dynamic driving metric output platform 102. For example, memory 112 may have, store, and/or include a dynamic driving metric output module 112a, a dynamic driving metric output database 112b, and a machine learning engine 112c. Dynamic driving metric output module 112a may have instructions that direct and/or cause dynamic driving metric output platform 102 to execute advanced computer vision methods for determining driving metric outputs, as discussed in greater detail below. Dynamic driving metric output database 112b may store information used by dynamic driving metric output module 112a and/or dynamic driving metric output platform 102 in dynamic driving metric output generation and/or in performing other functions. Machine learning engine 112c may have instructions that direct and/or cause the dynamic driving metric output platform 102 to perform dynamic driving metric output generation and to set, define, and/or iteratively refine optimization rules and/or other parameters used by the dynamic driving metric output platform 102 and/or other systems in computing environment 100.

FIGS. 2A-2J depict an illustrative event sequence for deploying a dynamic driving metric output platform 102 that utilizes improved computer vision methods to determine driving metrics in accordance with one or more example embodiments. This illustrative event sequence depicts a method for estimating ego-vehicle speed based on the ability to detect pavement road markings and uses the pre-established dimensions and spacing between these markings. In the case of US highways, urban, suburban and rural roads, the length of white road markings (e.g., broken lines between lanes of traffic going in a same direction) or yellow road markings (e.g., broken lines between lanes of traffic going in opposite directions) is universally established at ten feet. Similarly, the spacing between one white road marking (or yellow road marking) and the next is thirty feet. Given the fact that the white road markings (and/or yellow road markings) with the dimensions mentioned above are ubiquitous on US roads, this information may be exploited and used as a reference to determine the time it takes for the ego-vehicle to go from one white road marking to the next. Given the known distance between the markings, knowing the time to move over such distance may provide the speed. For simplicity, aspects herein may be described with respect to use of white markings, but it should be understood that yellow markings may be used without departing from the scope of the disclosure.

Figure 2A:
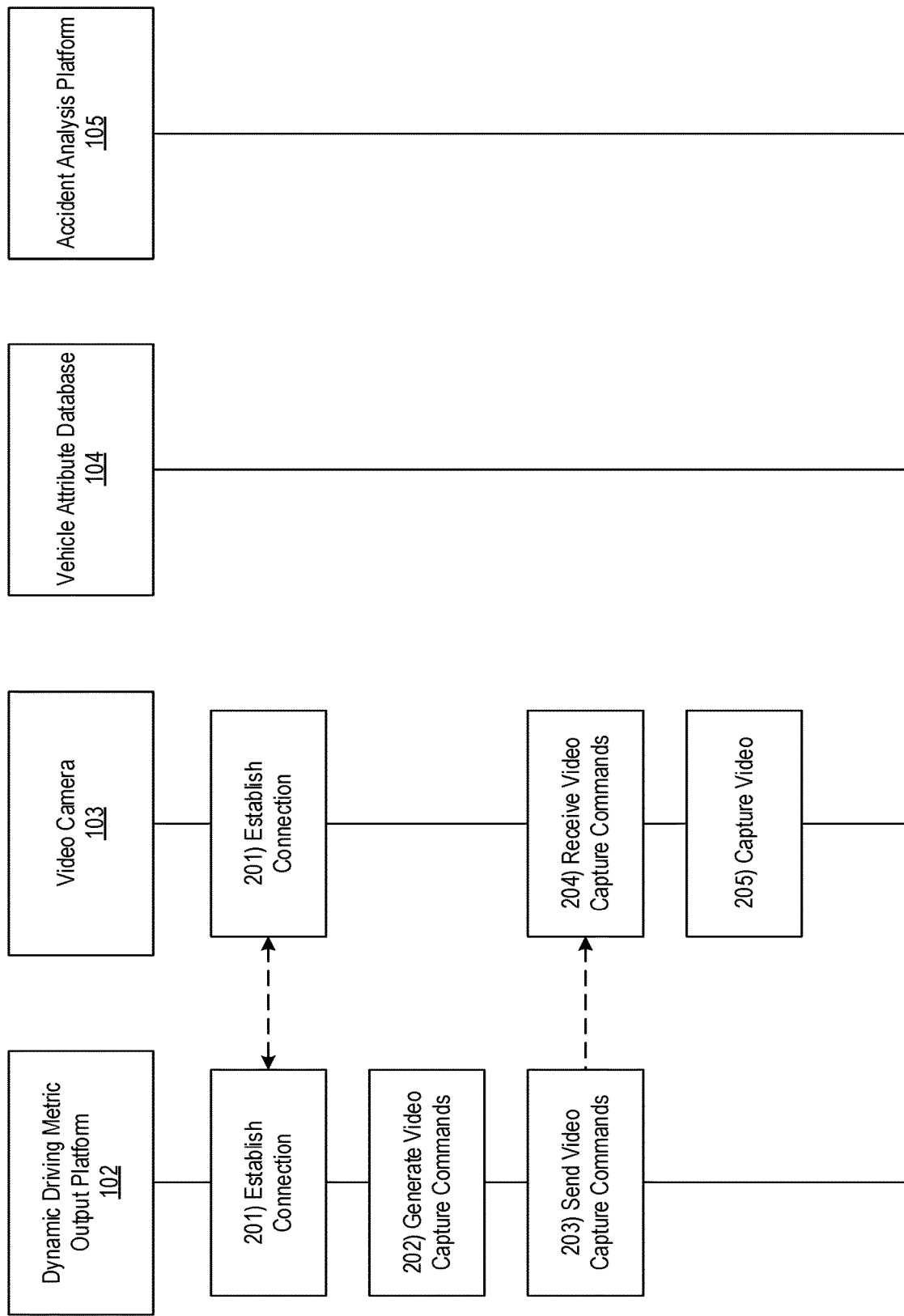

Referring to FIG. 2A, at step 201, the dynamic driving metric output platform 102 may establish a connection with the video camera 103. For example, the dynamic driving metric output platform may establish a first wireless data connection to the dynamic driving metric output platform 102 to link the dynamic driving metric output platform 102 to the video camera 103.

At step 202 the dynamic driving metric output platform 102 may generate one or more commands directing the video camera 103 to initiate video collection. At step 203, the dynamic driving metric output platform 102 may send the one or more commands directing the video camera 103 to initiate video collection to the video camera 103. In some instances, the dynamic driving metric output platform 102 may send the one or more commands directing the video camera 103 to initiate video collection via the communication interface 113 and while the first wireless data connection is established.

At step 204, the video camera 103 may receive the one or more commands directing the video camera 103 to initiate video collection sent at step 203. In some instances, the video camera 103 may receive the one or more commands directing the video camera 103 to initiate video collection while the first wireless data connection is established.

At step 205, the video camera 103 may capture video footage. In some instances, the video camera 103 may be located above a vehicle dashboard, and may capture video footage from the viewing angle of a driver of the vehicle (e.g., a road in front of the vehicle).

Figure 2B:
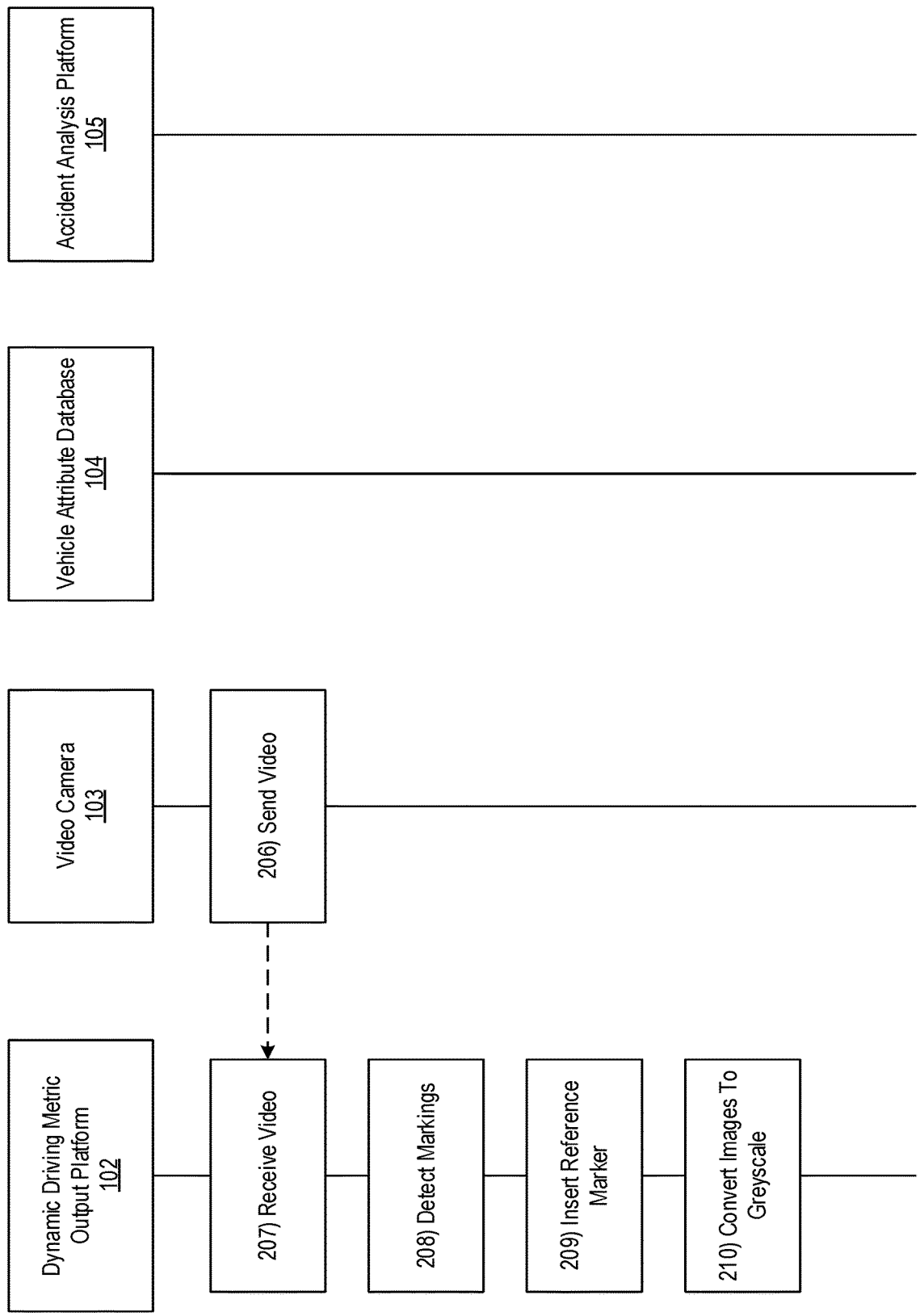

Referring to FIG. 2B, at step 206, the video camera 103 may send the video footage to the dynamic driving metric output platform 102. For example, the video camera 103 may send the video footage to the dynamic driving metric output platform 102 while the first wireless data connection is established.

At step 207, the dynamic driving metric output platform 102 may receive the video footage. For example, the dynamic driving metric output platform 102 may receive the video footage while the first wireless data connection is established and via the communication interface 113.

At step 208, the dynamic driving metric output platform 102 may perform actual detection of the white road markings on each of the 2D image frames of the video footage received at step 207, which may be achieved through any methods available for lane detection. Lanes based on the white road markings may be located to the left and/or to the right of the actual trajectory of the ego-vehicle. In some instances, a group of consecutive white road markings may define the lane. In some instances, other lanes beyond the ones mentioned may be detected. However, for the purposes of speed estimation, it may be sufficient to detect just one of the lanes in the immediate vicinity of the car.

In detecting the road markings, the dynamic driving metric output platform 102 may determine the parameters of a 2D line (e.g., line slope and a 2D point belonging to the line) that represents the actual lane obtained by finding one single line that goes through the middle of all the white road markings. In some instances, this line may be referred to as the 2D line that represents the lane.

Figure 3A:
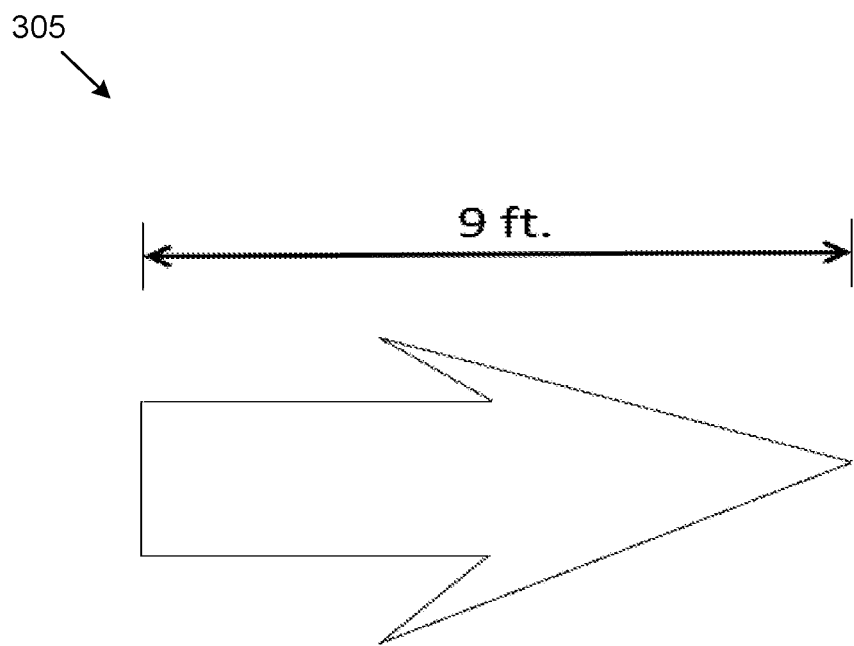
FIGS. 3A-3B depict the use of additional pavement markings by a dynamic driving metric output platform that utilizes improved computer vision methods in accordance with one or more example arrangements discussed herein.
Figure 3B:

In some instances, white road markings might not be available in the scene. In these instances, the dynamic driving metric output platform 102 may rely on other pavement markings that have predefined dimensions. FIGS. 3A-3B below provides two examples of these other markings. The dimension of the arrow 305 that is usually found very frequently on street roads on urban, suburban and rural roads is nine feet as FIG. 3A shows. The dynamic driving metric output platform 102 may also use the words written in the pavement such as the "ONLY" word 310 that has a predefined height of eight feet as shown in FIG. 3B. There are other pavement markings besides the two ones mentioned that may also be used to estimate camera parameters (for example the STOP AHEAD words are separated by forty feet and the words have a height of eight feet). Thus, there are several ways to extract the camera parameters for distance estimation.

At step 209, the dynamic driving metric output platform 102 may establish a reference marker (a 2D marker) on the image frame to establish timing when going from one image frame to the next. In some instances, the marker may be an imaginary short horizontal line located at a mostly fixed position on the image frame. By inserting the reference marker, the dynamic driving metric output platform 102 may establish a fixed position on the image frame that may be reasonably considered as a fixed position on the ground plane (road plane) that is located in front of the ego-vehicle (this fixed position on the ground plane is always at a fixed distance in front of the ego-vehicle and thus in the real 3D world it moves together with the ego-vehicle). By establishing the fixed position, the dynamic driving metric output platform 102 may determine a position corresponding to some fixed amount of meters in front of the car. In some instances, as the vehicle moves forward "X" feet/meters, this fixed position over the ground plane may also move forward "X" feet/meters. In some instances, the dynamic driving metric output platform 102 may use this fixed position to estimate the distance traveled by the vehicle because the fixed position and the vehicle may move the same distances. In these instances, the remaining task is to determine for a given distance that the marker moves what is the time that elapsed.

In some instances, the 2D marker line may intercept the 2D line representing the lane, and since the lane is mostly at a stable position between frames (because cars usually go through stable trajectories that allow the lanes to be located at the same positions across frames except for lane changes), then by fixing the x-coordinate of the marker's centroid the dynamic driving metric output platform 102 may ensure an intersection between the 2D line representing the lane and the marker across frames. In some instances, the y-coordinate of the marker might not be critical, however it is preferred to set it on the lower portion of the image frame. In some instances, the dynamic driving metric output platform 102 may determine a lane change by the ego-vehicle and upon completion of the lane change the dynamic driving metric output platform 102 may re-position the marker to maintain the intersection between the marker and the stable 2D line representing the lane.

At step 210, the dynamic driving metric output platform 102 may convert the image frame to a grey scale image. In some instances, the dynamic driving metric output platform 102 may convert the image frame to a grey scale image using the location of the marker inserted at step 209.

Referring to FIG. 2C, at step 211, the dynamic driving metric output platform 102 may detect, over the gray scale image, a high relative transitioning on the brightness across the length of the marker (e.g., brightness transition level exceeds a predetermined threshold). In doing so, the dynamic driving metric output platform 102 may detect the moment when the white road marking touches the marker. In some instances, the dynamic driving metric output platform 102 may start the speed estimation method on an image frame where the marker is located over the actual road pavement far away from any white road marking. In these instances, the dynamic driving metric output platform 102 may determine a uniform measure of brightness across the length of the marker because the brightness of the road pavement may be mostly uniform. This is further illustrated by FIG. 5 that shows the sketches of white road markings and it shows the 2D marker position at three points in time (each point in time is represented by one of the three image frames). The frame to the left (frame 505) illustrates the example described above.

Figure 4:
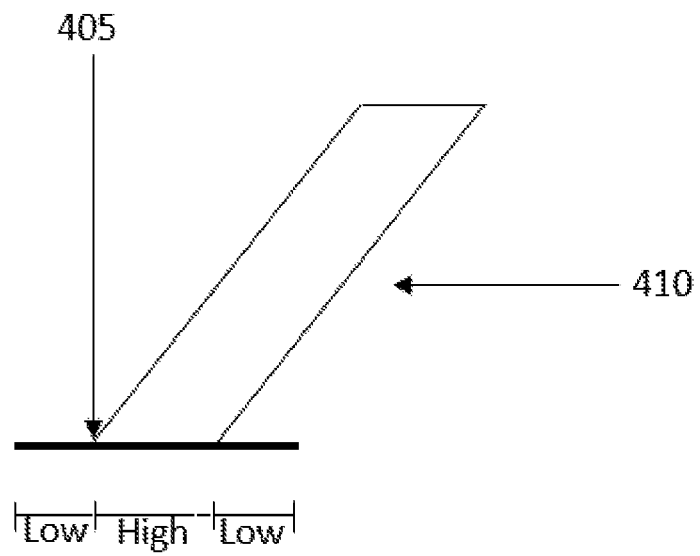
FIG. 4 depicts a brightness transition along a road marking determined by a dynamic driving metric output platform that utilizes improved computer vision methods in accordance with one or more example arrangements discussed herein.
Figure 5:
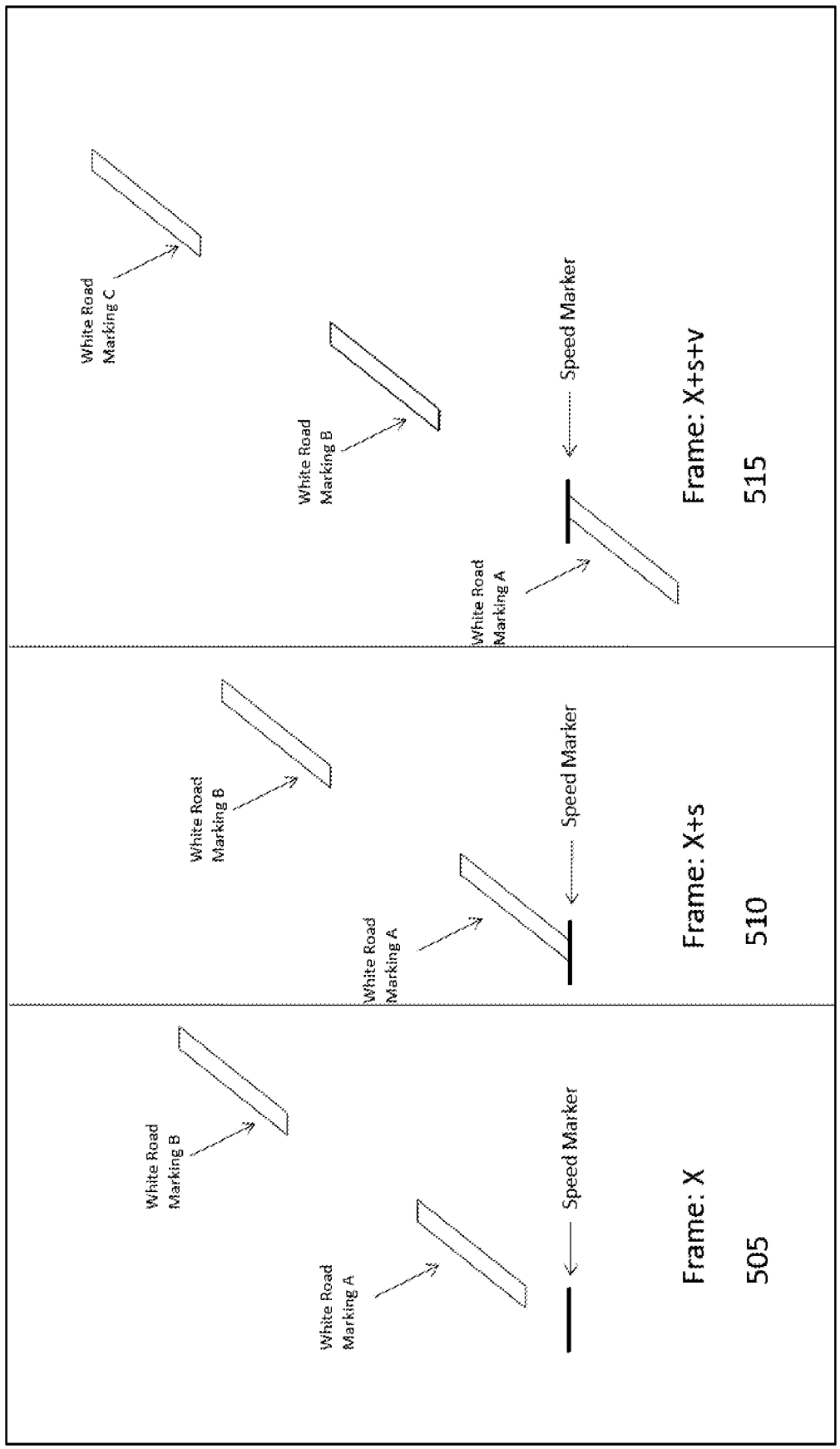
FIG. 5 depicts three image frames used to estimate absolute ego-vehicle speed by a dynamic driving metric output platform that utilizes improved computer vision methods in accordance with one or more example arrangements discussed herein.

The dynamic driving metric output platform 102 may continue to progress through the images that make up the video footage. In doing so, the dynamic driving metric output platform 102 may determine that a white road marking is closer to the marker's position (due to the forward motion of the ego-vehicle) in each image. As a result, at some point the dynamic driving metric output platform 102 may determine that the marker is located over the beginning of the white road marking (FIG. 5 central frame illustrates this). In this instance, the dynamic driving metric output platform 102 may determine that the marker touches the white road marking. In making this determination, the dynamic driving metric output platform 102 may detect a relatively high transition between the brightness of the image frame pixels when going from left to right on each of the marker's individual point locations. In some instances, the dynamic driving metric output platform 102 may determine the transition because of the contrast that exists between the brightness of the pavement and the brightness of the white marking. In these instances, the marker may be long enough so that the marker is longer than the width of the white road marking. As a result, as the dynamic driving metric output platform 102 reads pixels from left to right, the first pixels read may be located over the pavement and a transition may occur on a white marking. The dynamic driving metric output platform 102 may set a threshold for detection by making the brightness of the white road marking a multiplicative factor higher than the brightness of the surrounding road pavement. In some instances, overall luminosity variations between image frames might not influence the accuracy of the detection because these variations increase or decrease brightness levels of pavement and white marking equally and thus the relative brightness stays mostly unmodified. FIG. 4 illustrates a typical case of the marker 405 touching the beginning of a white road marking and the corresponding three zones for brightness that result from reading pixel brightness along the marker from left to right (two low brightness zones corresponding to the pavement and a central high brightness zone corresponding to the white road mark 410). In some instances, it may be enough for the dynamic driving metric output platform 102 to detect the first high brightness transition indicated on the figure, however a second transition from high to low brightness may also be detected by the dynamic driving metric output platform 102 to confirm the presence of the white road marking.

At step 212, the dynamic driving metric output platform 102 may determine that the white road marking touches the marker and may set the first time-stamp by recording the image frame index number. In some instances, the dynamic driving metric output platform 102 might not determine locations of all the four corners of the white road marking through the method described herein. In these instances, determining a line's slope and one 2D point belonging to the representative line may be sufficient to produce the precise location for such line. Thus, this disclosure describes a method to detect the moment when the beginning of the white road marking touches the marker.

After inserting the first time-stamp, the dynamic driving metric output platform 102 may move over the next frames and the marker may continue to detect more high brightness transitions. This will continue until the moment when we reach the end of the white road marking.

At step 213, the dynamic driving metric output platform 102 may determine the end of the white road marking. In some instances, the dynamic driving metric output platform 102 may determine the end of the white road marking by detecting an absence of high transition after the streak of high transitions that started with the first time-stamp (e.g., brightness transition level exceeds a predetermined threshold). This event may signal that the marker reached the end of the white road marking. At the frame when this happens, the dynamic driving metric output platform 102 may record the image frame index number, which may become the second time-stamp.

This method is further illustrated with regards to FIG. 5. FIG. 5 below illustrates the procedure mentioned above by showing sketches corresponding to three image frames. The sketches show the white road markings that may correspond to the lane that may be detected over the left side of the vehicle. Frame 505 shows two consecutive white road markings A and B and the 2D marker location (which is close to the beginning of white road marking A), the index number for this fame is: X. Frame 510 illustrates the moment when the beginning of the white road marking touches the marker. The center frame's index number is: X+s and this number becomes the first time-stamp. Frame 515 shows the moment when the marker reaches the end of white road marking A (the sketch also shows the next white road marking C that would come after B). The index number for frame 515 is: X+s+v and this number becomes the second time-stamp.

At step 214, the dynamic driving metric output platform 102 may determine the time in seconds that elapsed between the first and second time stamps, which may ultimately be used to determine speed. In some instances, the dynamic driving metric output platform 102 may use the video's frame rate measured in frames per seconds (fps). This is a value that may universally be available on the meta data in the video file for all video formats. The dynamic driving metric output platform 102 may determine the time in seconds between time stamps using equation one below:

$$\text{Time\_between\_time\_stamps} = \frac{v}{fr} \quad (1)$$

Figure 2D:
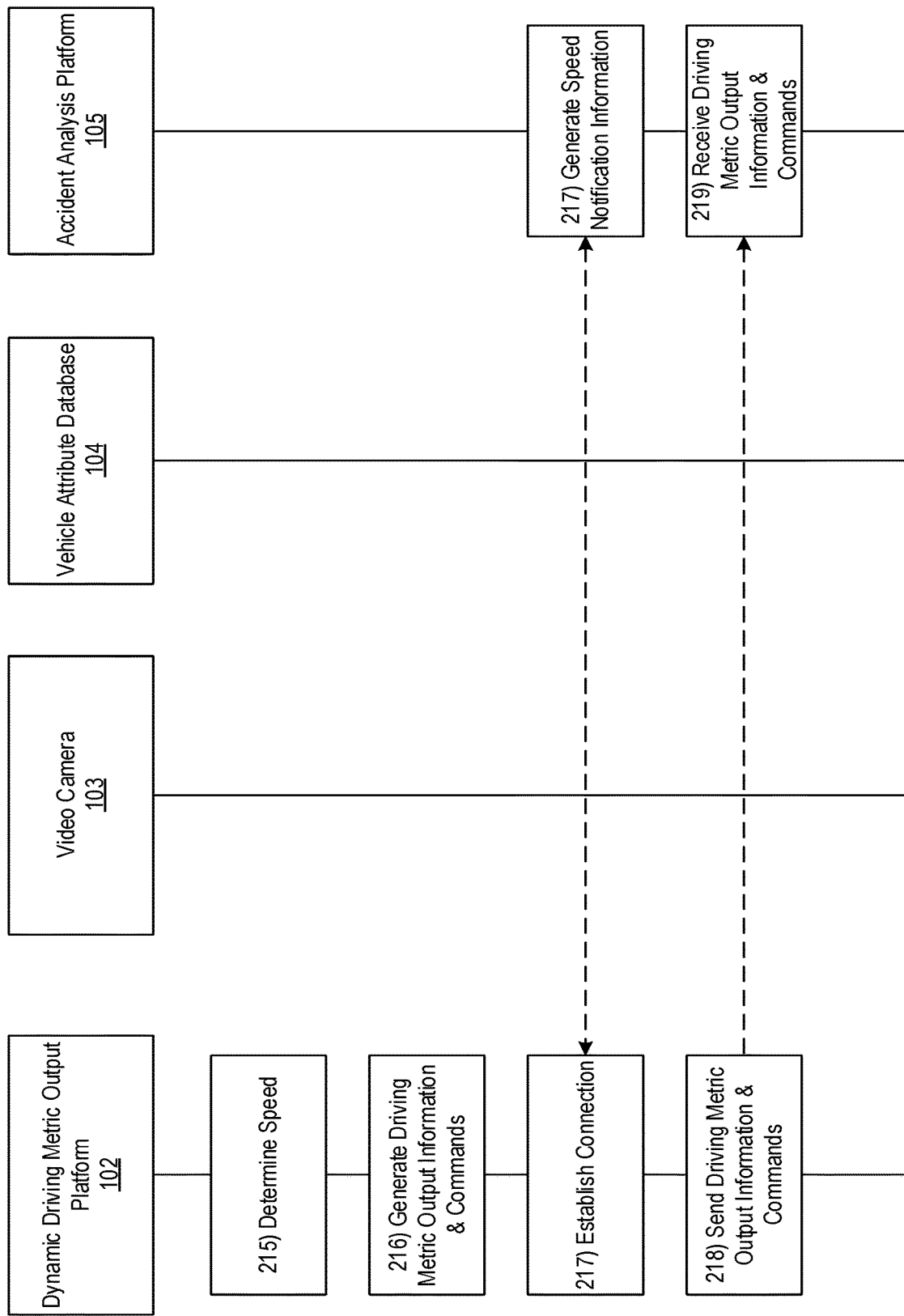

Referring to FIG. 2D, at step 215, the dynamic driving metric output platform 102 may calculate a vehicle speed. In equation one above fr may be the frame rate in fps. Therefore, the dynamic driving metric output platform 102 may determine the speed in feet/seconds by dividing the distance of ten feet (distance between time stamps one and two) by the time expressed in equation one. Thus the speed of the ego-vehicle for the case described above is calculated by the dynamic driving metric output platform using equation two:

$$\text{Speed} = \frac{10 \times fr}{v} \quad (2)$$

For a typical video file at thirty fps the maximum speed that may be detected with the current method is two hundred miles/hr, which is far above the range of speeds that is allowed on all US roads.

It should be noted that even through a lane change the dynamic driving metric output platform 102 may detect the speed using the method mentioned above with the caveat that the x-coordinate of the marker's centroid may move as the lane moves. The dynamic driving metric output platform 102 may still calculate the timings for the time-stamps through the same procedure described above, although the x-coordinate of the marker's centroid positioning that follows the lane through the lane change maneuver may change.

In some instances, this may allow the dynamic driving metric output platform 102 to use one single white road marking to determine a speed of the vehicle. In some instances, the dynamic driving metric output platform 102 may use two consecutive white road markings. In this instance, after the second time-stamp mentioned above, the dynamic driving metric output platform 102 may set a third time-stamp by recording the frame index number when the marker touches the beginning of white road marking B (as shown in FIG. 5), which is at a distance of thirty feet from the end of white road marking A (as shown in FIG. 5). In this instance, the dynamic driving metric output platform 102 may use the third and the second time-stamps to determine the time for the ego-vehicle to travel thirty feet. After this point, the dynamic driving metric output platform 102 may return to step 212, and may assign the third time-stamp as the first time-stamp before initiating a new cycle of speed estimation.

In yet another instance, the dynamic driving metric output platform 102 may use two lanes instead of one to determine the vehicle speed. In this instance, in addition to the left lane as it was the case illustrated above, the dynamic driving metric output platform 102 may also use the right lane and thus may incorporate another set of white road markings into the estimation process. For example, the dynamic driving metric output platform 102 may estimate speed using the left lane. In this example, since the white road markings on a typical left-lane and right lane scenario are not aligned (at a point when we have pavement on the left lane we have white road marking on the right lane) the dynamic driving metric output platform 102 may determine an additional ego-vehicle speed reading. For example, the dynamic driving metric output platform may estimate an additional speed reading using information from the right lane (with the marker assigned to the right lane having touched already the beginning of a white road marking) while the marker on the left lane is still between the end of a white road marking and the beginning of the next.

It should be noted that there may be a little quantization error associated with this speed determination method due to the fact that the number of frames per second may be finite. In this case, it may be possible for the speed marker not to "touch" the actual beginning of the white road marking. Instead, the first time the marker lands on the white road marking it may land a little bit beyond the beginning. In this instance, the distance between time-stamps one and two may be less than ten feet. This may be particularly true for high ego-vehicle speeds. The dynamic driving metric output platform 102 may solve this situation at the frame where the marker lands on the white marking by performing a scan along the line representing the lane and performing the same type of brightness transition detection mentioned above over horizontal lines that intercept the lane. The horizontal lines for scanning may move below the position (e.g., in the direction of increasing the y-coordinate) where the marker landed to search for the actual beginning of the white road marking. The beginning of the white road marking may be detected at the first time an absence of a high brightness transition occurs, which signals that the dynamic driving metric output platform 102 has reached the pavement. Thus, the dynamic driving metric output platform 102 may register the y-location immediately above the absence detected above as the beginning of the white marking. The dynamic driving metric output platform 102 may resolve the quantization error for the case of reaching the end of the white road marking by applying a scanning procedure similar to the one mentioned above, with the difference being that instead of scanning below the marker, the dynamic driving metric output platform 102 may scan above the marker searching for the actual end of the white road marking.

At step 216, the dynamic driving metric output platform 102 may generate driving metric output information and one or more commands directing the accident analysis platform 105 to generate a driving metric output interface using the driving metric output information. In some instances, in generating the driving metric output information, the dynamic driving metric output platform 102 may generate information corresponding to the speed of the vehicle determined at step 215.

At step 217, the dynamic driving metric output platform 102 may establish a connection with accident analysis platform 105. In some instances, the dynamic driving metric output platform 102 may establish a second wireless data connection with the accident analysis platform 105 to link the dynamic driving metric output platform 102 to the accident analysis platform 105.

At step 218, the dynamic driving metric output platform 102 may send the driving metric output information and the one or more commands directing the accident analysis platform 105 to generate the driving metric output interface using the driving metric output information to the accident analysis platform 105. In some instances, the dynamic driving metric output platform 102 may send the driving metric output information and the one or more commands directing the accident analysis platform 105 to generate the driving metric output interface using the driving metric output information via the communication interface and while the second wireless data connection is established.

At step 219, the accident analysis platform 105 may receive the driving metric output information and the one or more commands directing the accident analysis platform 105 to generate the driving metric output interface using the driving metric output information from the dynamic driving metric output platform 102. In some instances, the accident analysis platform 105 may receive the driving metric output information and the one or more commands directing the accident analysis platform 105 to generate the driving metric output interface using the driving metric output information while the second wireless data connection is established.

Referring to FIG. 2E, at step 220, the accident analysis platform 105 may generate a driving metric output interface based on the driving metric output information and the one or more commands directing the accident analysis platform 105 to generate the driving metric output interface using the driving metric output information received at step 219. In some instances, in generating the driving metric output interface, the accident analysis platform 105 may generate and cause display of a graphical user interface similar to graphical user interface 605, which is shown in FIG. 6. In some instances, in causing display of the graphical user interface 605, the accident analysis platform 105 may cause display of various driving metrics determined throughout the method, such as the speed determined at step 215 and/or an acceleration value.

Figure 7:
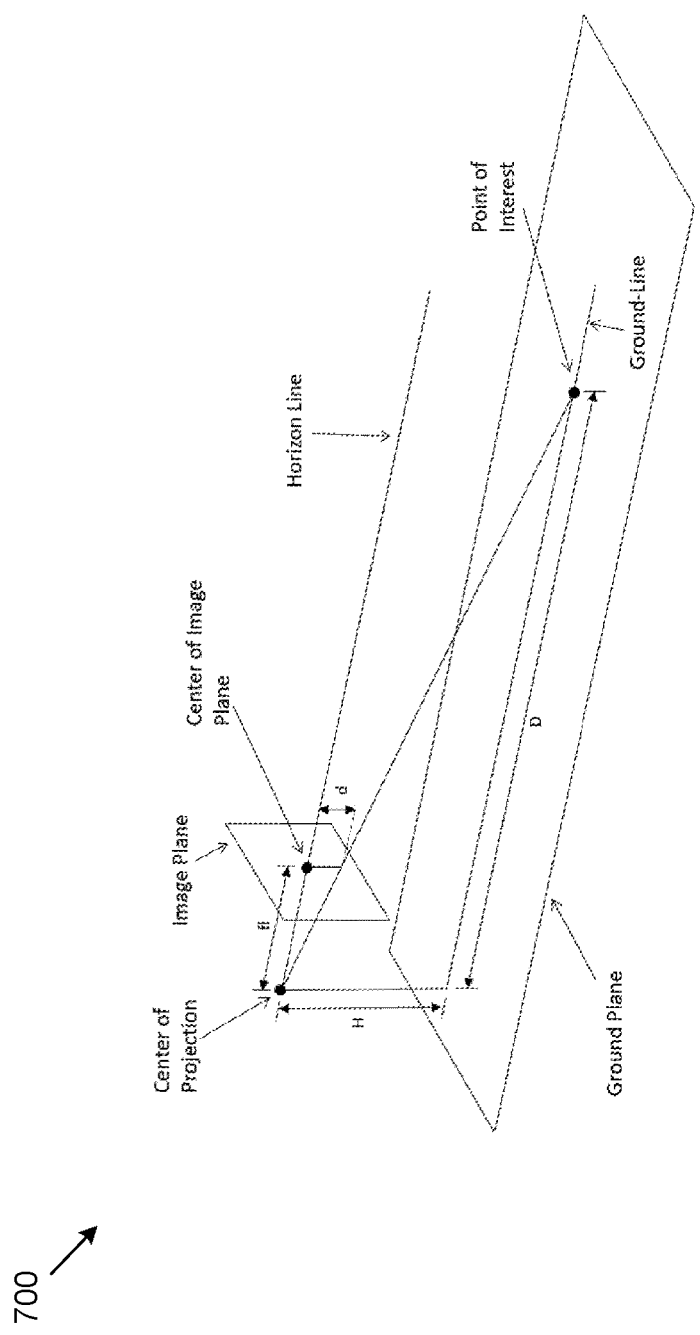
FIGS. 7-12 depict sketches for a dynamic driving metric output platform that utilizes improved computer vision methods in accordance with one or more example arrangements discussed herein.

In addition to, or as an alternative to, estimating the vehicle speed as described above, the dynamic driving metric output platform 102 may estimate distances. In some instances, the dynamic driving metric output platform 102 may estimate distance based on perspective projection methods and more specifically based on perspective divide calculations. In performing the perspective divide calculations, the dynamic driving metric output platform 102 may determine real world distances from measurements performed over a 2D image generated from a real-world scene (e.g., the video received at step 207). Described below is the process for applying perspective divide methods to estimate real world distance of points located over the ground plane. FIG. 7 provides a diagram showing the application 700 of perspective divide to one example case. For example, FIG. 7 shows the various elements involved in the perspective divide calculation. These elements may correspond to a real-life setting where a camera is mounted on a vehicle (e.g., facing forward on the dashboard).

At step 221, the dynamic driving metric output platform 102 may determine a height, the focal length and the tilt angle of the video camera 103. In some instances, the dynamic driving metric output platform 102 may determine a height H that the video camera 103 is located above the ground plane. In some instances, the height may be determined based on vehicle information (e.g., dimensions) received from a vehicle database (e.g., vehicle attribute database 104).

At step 222, the dynamic driving metric output platform 102 may determine a ground plane. In some instances, the dynamic driving metric output platform 102 may determine that the ground plane is the actual road, which may be assumed to be flat over the duration of a driving trip.

At step 223, the dynamic driving metric output platform 102 may determine a horizon line, corresponding to a line that starts at the center of projection and continues towards what is called on perspective the vanishing point. For example, when an image of the road is observed, the right and the left lanes that are closest to the vehicle might not be parallel in the 2D image even though they may be parallel in the real world. If these two lanes are extrapolated in the image, they intersect at an imaginary point. This imaginary point may be referred to as a vanishing point in projection. As illustrated in FIG. 6, the vanishing point may be located at infinity if one were to continue in the direction facing forward over the horizon line. Accordingly, the dynamic driving metric output platform 102 may determine a representation of the vanishing point on the 2D image (which may be obtained from the image plane on the scene represented by FIG. 6) that may be located on the exact center of the image.

Figure 2F:
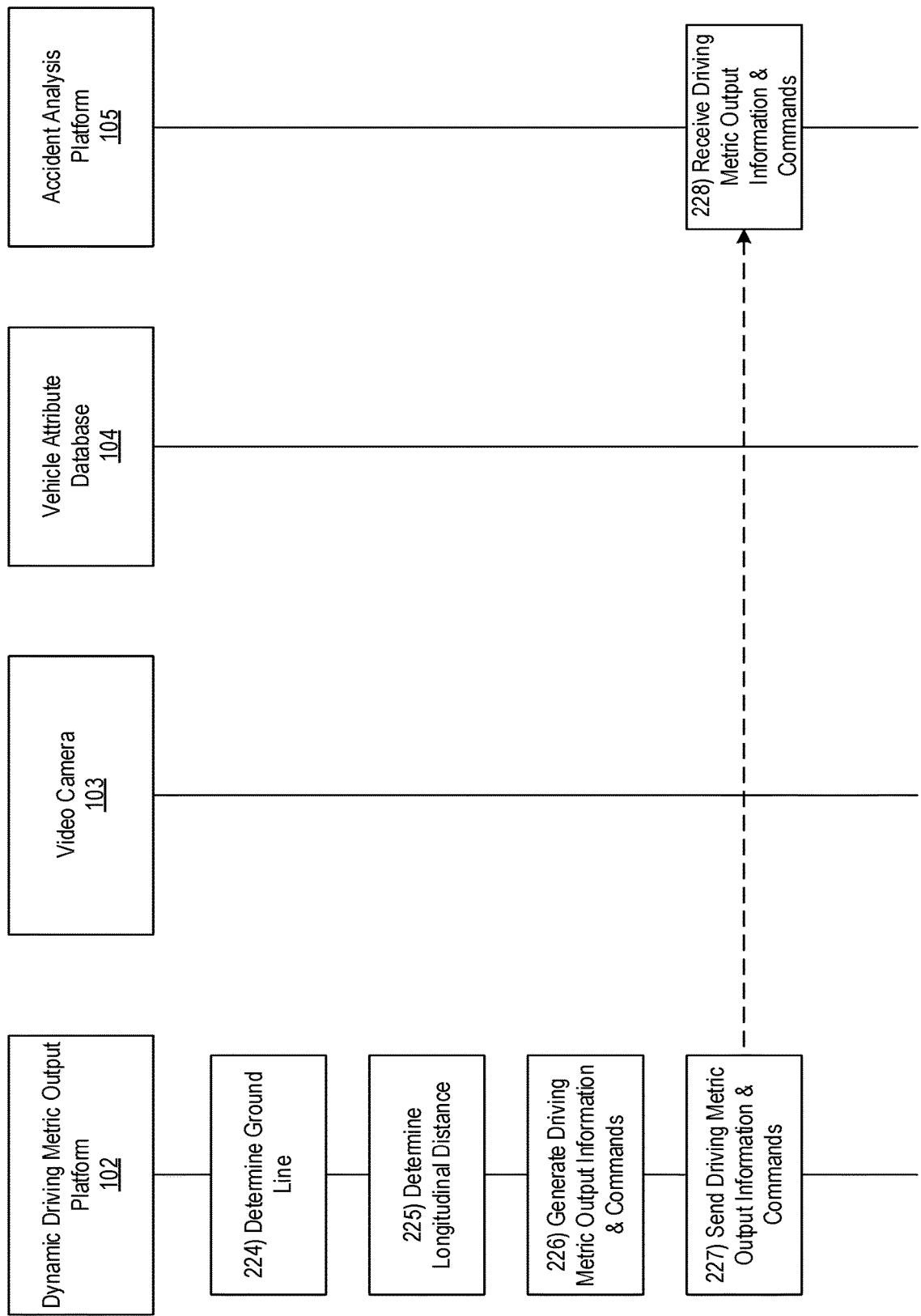
Figure 8:
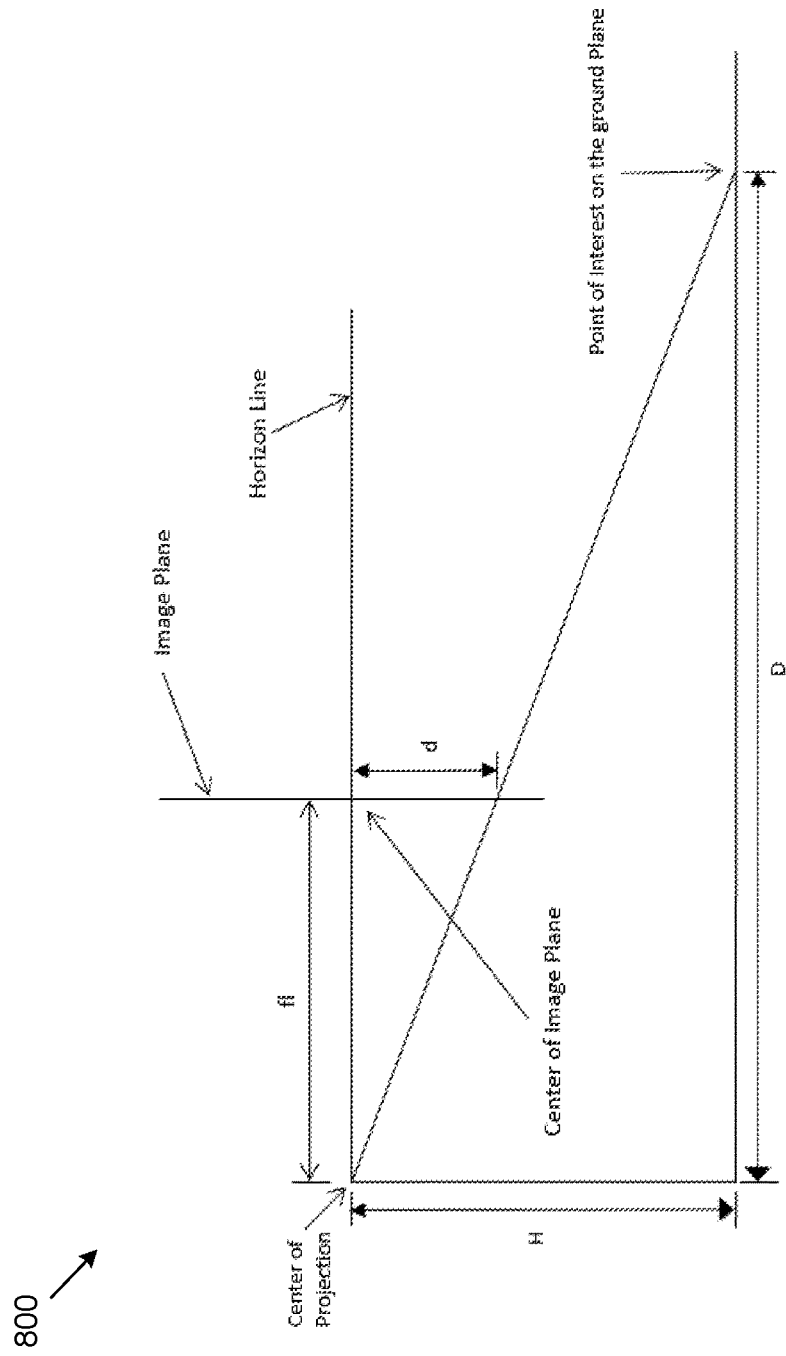

Referring to FIG. 2F, at step 224, the dynamic driving metric output platform 102 may determine a ground line (more specifically the dynamic driving metric output platform 102 determines the 2D representation of the ground line). In some instances, the point of interest may be located over a line that is at the intersection of two orthogonal planes. These planes may be the ground plane (which is a horizontal plane) and a vertical plane that goes through the middle of the image plane. In some instances, this vertical plane may bisect the image plane and thus it shall be referred to as the bisecting plane. Therefore, at this step, the dynamic driving metric output platform 102 may be focusing on finding distances along the line at the intersection of the two orthogonal planes mentioned above, referred to herein as the "ground line". This ground line is precisely the one over which the distance D is marked on FIG. 6. FIG. 8 illustrates the bisecting plane 800 that contains all the geometry relationships of interest as were determined above at steps 221-224. For example, FIG. 8 illustrates a more simplified view of the different elements involved on the perspective divide method described by steps 221-224. The 2D representation of the ground line is determined according to the procedure mentioned below using the vanishing point.

As previously indicated, the objective of using this perspective divide method is to find the distance D between a point of interest located on the ground plane and the center of projection. At step 225, the dynamic driving metric output platform 102 may determine the distance D (which we will name longitudinal distance) using equation three:

$$D = \frac{fl \times H}{d} \quad (3)$$

In equation three above, fl is the camera's focal length (which is the distance between the center of projection and the image plane), and H is the video camera's 103 height above the ground plane. This is illustrated in FIG. 7, which shows that the line connecting the center of projection and the point of interest on the ground plane intercepts the image plane at a point that is at a distance d below the middle of the image plane. In some instances, the distance d on equation three may be measured in pixels and consequently the focal length may also be expressed in units of pixels. In some instances, D may be expressed in the same units chosen for H (for example feet, meters, or the like).

In some instances, the dynamic driving metric output platform 102 may use Equation three to determine distances in front of the video camera 103 for points in the ground plane that are also contained in the bisecting plane. However, it may be difficult to obtain these distances without knowing the focal length fl or the height H.

In some instances, the dynamic driving metric output platform 102 may estimate distance without information on parameters of the video camera 103 such as focal length and height above the ground plane. In these instances, the dynamic driving metric output platform 102 may use intermittent white road markings on U.S roads having a standard and universal length of ten feet to estimate distance. Furthermore, the standard space between these white road markings is thirty feet. The dynamic driving metric output platform 102 may apply the perspective divide equation (equation three) in a particular way to exploit the distance information mentioned above. For example, the dynamic driving metric output platform 102 may apply the perspective divide equation as follows (equations four, five, and six respectively):

$$D1 = \frac{fl \times H}{d1} \quad (4)$$

$$D2 = \frac{fl \times H}{d2} \quad (5)$$

$$D1 - D2 = fl \times H \times \left(\frac{1}{d1} - \frac{1}{d2}\right) \quad (6)$$

In some instances, the dynamic driving metric output platform 102 may apply equations four and five above to determine the real-world distances D1 and D2 for two points located on the ground plane. In these instances, H may represent the height of the camera above the ground plane and fl may represent the focal length of the video camera 103. The dynamic driving metric output platform 102 may then use equation six to determine the difference in real world distance between the two points on the ground plane. In doing so, the dynamic driving metric output platform 102 may associate D1 and D2 to points in the ground plane for which D1-D2 is a known value. In these instances, the ground line may be parallel to the longest borders of the white road marking rectangle because most of the time the ego-vehicle may move forward in a direction parallel to the lines demarked by these white markings. Accordingly, the beginning and the end of a white road marking may be ideal candidates for the two points mentioned above (for D1 and D2), however these points may only work if the ground line would go through the centroid of the white road marking (or in other words if the white road marking would be located at the center of the image plane). In a real-life situation this might not be the case.

In some instances, the white road markings may be located towards the left or towards the right of the middle of the image frame (because the ego-vehicle may be driving on the middle of the lane demarked by the left and by the right white road markings). In these instances, the perspective divide calculation mentioned previously may account for this fact since the distance calculation considered points on the ground line which may be contained by the bisecting plane. In some instances, all the real-world points belonging to the white road markings might not be contained in the bisecting plane. In these instances, the dynamic driving metric output platform 102 may determine pan angle of the video camera 103 is close to zero, and that, accordingly, horizontal lines in 3D space may still be horizontal when these lines are represented in 2D space by the video camera 103 (e.g., in 3D world a pan angle close to zero may be equivalent to having the image plane orthogonal or very close to being orthogonal to the longest borders of the white road markings located at the right and at the left of the ground line). Therefore, in the 2D image the dynamic driving metric output platform 102 may project the beginning and the end of every white road marking over the 2D representation of the ground line by obtaining the intercept points over this line of the horizontal lines aligned with the beginning and with the end of the white road markings. In doing so, the dynamic driving metric output platform 102 may obtain distances d1 and d2.

Figure 9:
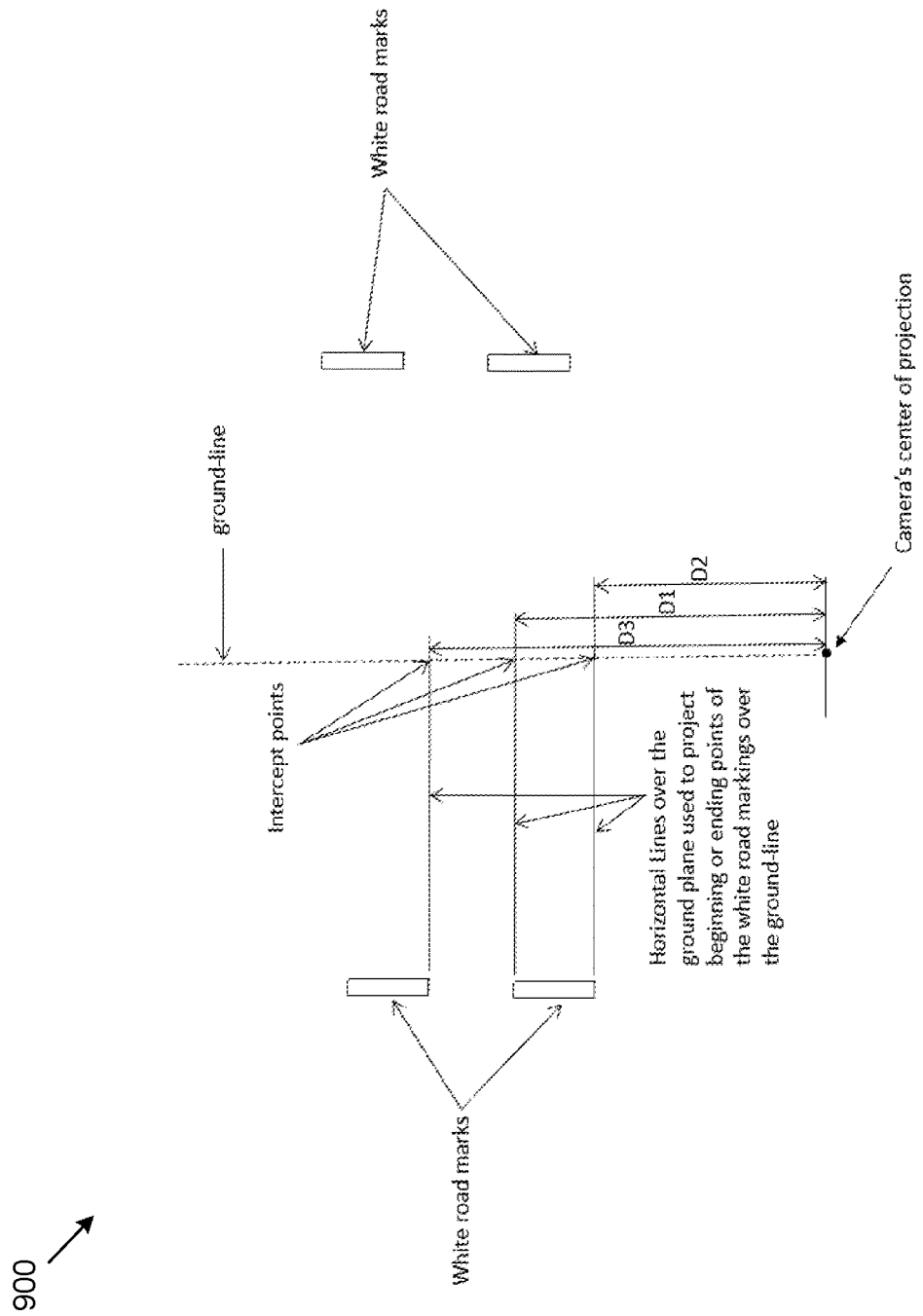
Figure 10:
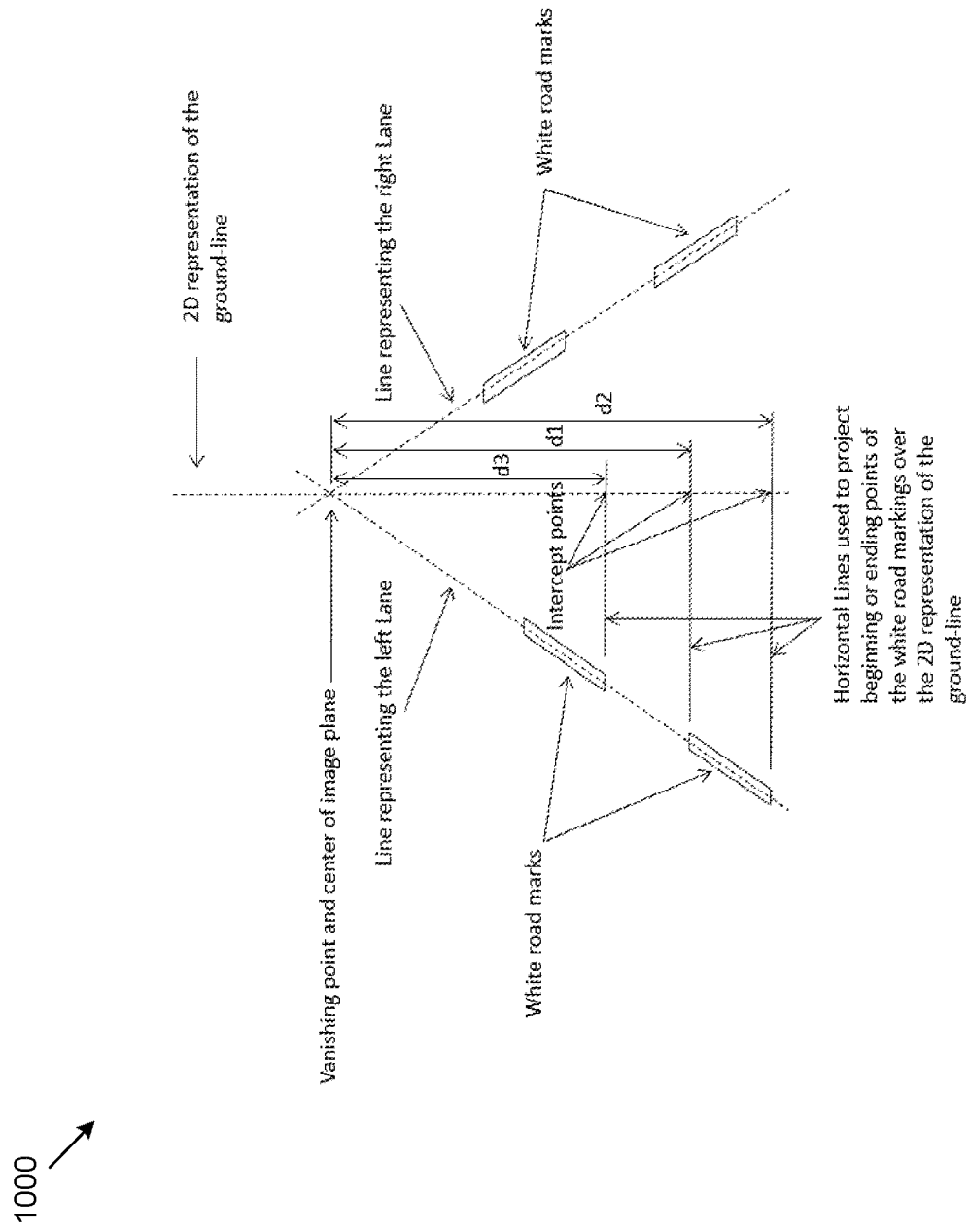

In the 3D world, when horizontal lines aligned with the beginning and with the end of the white road marking are projected orthogonally over the ground line, they may generate two intercept points (e.g., the projections) on the ground line and the distance between these intercept points may be ten feet. This is because the ground line may be parallel to the longest border of the white road marking and the distance between the beginning and the end of the white marking may translate to the distance between intercept points in the ground line by applying Euclidian geometry. Additionally, in the 3D world the distance from the video camera's 103 image plane to the horizontal lines aligned with the beginning and with the end of the white road markings may correspond to D2 and D1 respectively. FIG. 9 shows a sketch 900 of the ground plane in front of the video camera 103 from the bird's eye point of view and it illustrates the descriptions mentioned above for the 3D scene. FIG. 10 provides a sketch 1000 of the 2D representation generated by the video camera 103 of the scene shown in FIG. 9.

FIG. 10 shows the projection over the 2D line representing the ground line of three horizontal lines. The first two horizontal lines may correspond to the left white road marking closer to the video camera 103 and the dynamic driving metric output platform 102 may generate the intercept points associated with distances d1 and d2 using these horizontal lines. FIG. 10 also shows one more horizontal line that corresponds to the beginning of the next left white road marking. In some instances, the dynamic driving metric output platform 102 may use the intercept point corresponding to the next left white road marking to determine the distance d3. FIG. 10 shows that there may be a dashed line that runs through the middle of the white road markings over the left that is called the line that represents the left lane. Similarly, FIG. 10 shows that there may be a dashed line that represents the right lane.

FIG. 10 also shows that the two lines representing the left and the right lane may intercept each other at a point called the vanishing point. In accordance with the concepts described above with regards to perspective transformations, the vanishing point may be the 2D representation of the horizon-line mentioned above. In FIG. 9, the vanishing point may be the center of the image plane (in some instances, image plane and image frame may have the same center and these terms may be used interchangeably). In these instances, the video camera 103's tilt and pan angles may be zero. In real-life camera mounting situations these angles may deviate slightly from zero. In these instances, the vanishing point might not be co-located with the center of the image frame (or the center of the image plane) and thus the vanishing point may be above or below the center of the image frame depending on the video camera 103's tilt making a negative or a positive angle with the horizon line. In instances of having a pan angle slightly different from zero, the vanishing point may be slightly to the right or to the left of the center of the image frame. To account for small pan angle variations, the dynamic driving metric output platform 102 may calculate the vanishing point (obtained from the intersection of the 2D lines representing the right and the left lane) and may use the vanishing point to determine the location of the 2D line representing the ground line (which may be a vertical line going through the vanishing point and may be slightly to the right or to the left of the center of the image frame). Accordingly, the dynamic driving metric output platform 102 might not rely on the center of the image frame. In instances of a non-zero pan angle, the 2D line representing the vanishing point may be slightly to the left or to the right of the center of the image frame.

In the procedure illustrated by FIG. 10, d1 may be equal to the distance in pixels from the y-coordinate of the middle point of the 2D image frame (which may be co-located with the vanishing point) to the y-coordinate of the intercept point obtained by projecting a horizontal line from the beginning of the white road marking to the 2D representation of the ground line. Similarly, the dynamic driving metric output platform 102 may obtain d2 by measuring the distance in pixels between the y-coordinates of the middle of the image frame and the intercept point associated with the end of the white road marking.

From equation six above, the dynamic driving metric output platform 102 may obtain the value of the product of focal length and height above the ground plane. Equation seven shows this:

$$fl \times H = \frac{D1 - D2}{\left(\frac{1}{d1} - \frac{1}{d2}\right)} \tag{7}$$

All the values on the right side of equation seven may be known to the dynamic driving metric output platform 102. Furthermore, the dynamic driving metric output platform 102 may determine that the value of D1-D2 is ten feet. Therefore, the dynamic driving metric output platform 102 may obtain any distance in front of the vehicle without knowing either the focal length or the height above the ground plane by using the actual product of both values from equation seven above. For example, the dynamic driving metric output platform 102 may determine a real-world distance of a random point at a distance of d_pt pixels from the middle point of the image frame (measured over the 2D vertical line). Equation eight below provides the value of the distance D_pt in feet.

$$D\_pt = \frac{fl \times H}{d\_pt} \tag{8}$$

$$D\_pt = \left(\frac{1}{d\_pt}\right) \times \frac{(D1 - D2)}{\left(\frac{1}{d1} - \frac{1}{d2}\right)} \tag{9}$$

The dynamic driving metric output platform 102 may determine equation nine by applying equation seven on equation eight. All the values on the right side of equation nine may be known to the dynamic driving metric output platform 102. Therefore, it might not necessary for the dynamic driving metric output platform 102 to know the actual focal length value or the actual value of the height of the video camera 103 above the ground.

Figure 11:
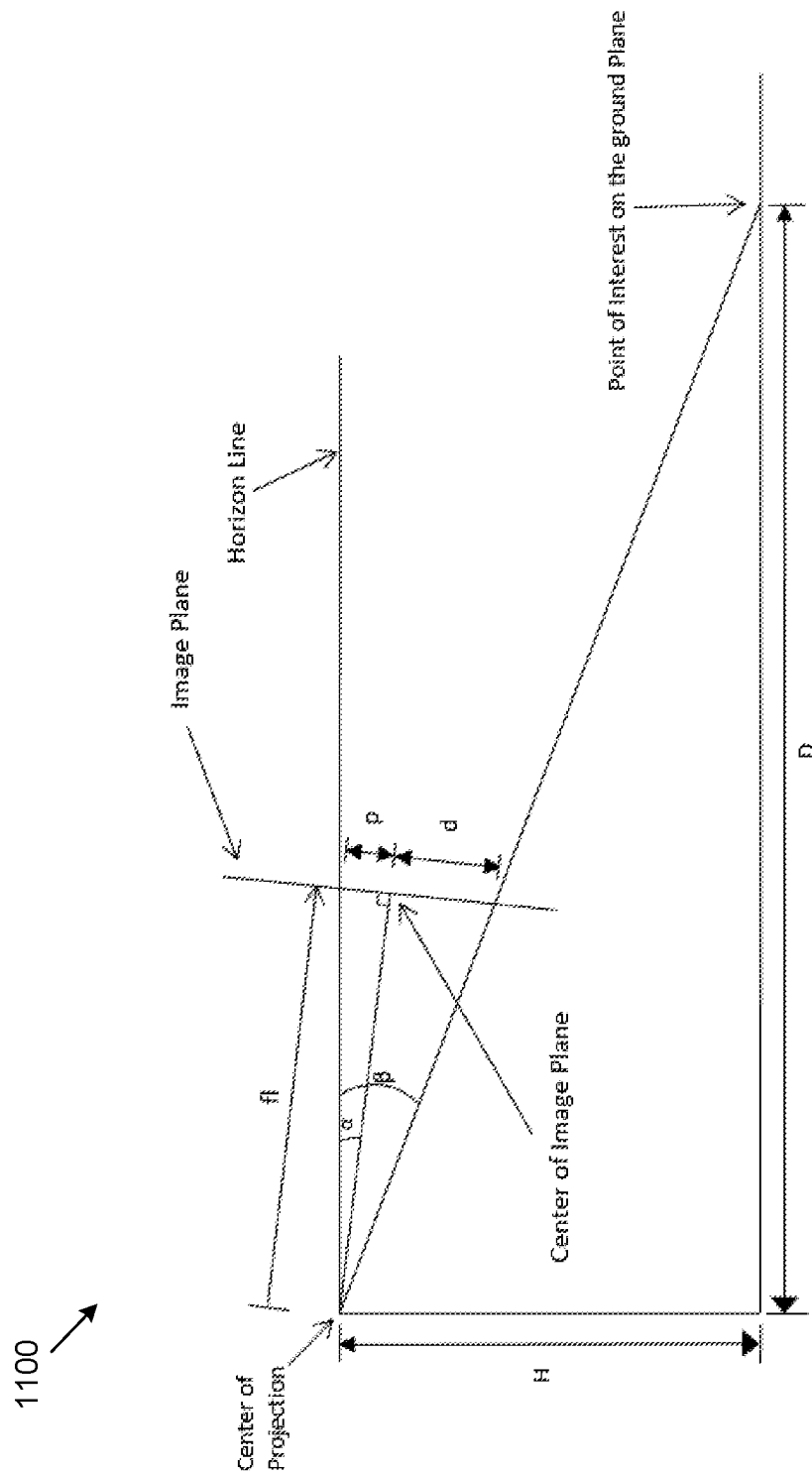

In some instances, the tilt angle of the video camera 103 might not be zero. In these instances, the dynamic driving metric output platform 102 may perform a refined distance estimation method at step 225. FIG. 11 illustrates a sketch 1100 when the video camera 103 has a tilt angle α. In this example, the image plane may be tilted by this same angle. FIG. 11 shows the Horizon Line determined above at step 223. In this example, the Horizon Line may be represented by a single point on the image plane and located at a distance of p pixels from above the center of the image plane as FIG. 11 shows.

FIG. 11 shows that the point of interest in the ground plane is represented on the image plane as a point located at a distance of d pixels from the center of the image plane. In this instance, the dynamic driving metric output platform may modify the perspective divide calculations change as follows (equations ten to twelve respectively):

$$\text{Tan}(\beta - \alpha) = \frac{d}{fl} \tag{10}$$

$$\text{Tan}(\beta) = \frac{H}{D} \tag{11}$$

$$D = \frac{H \times \left(1 - \tan(\alpha) \times \left(\frac{d}{fl}\right)\right)}{\frac{\alpha}{fl} + \text{Tan}(\alpha)} \tag{12}$$

Equations ten through twelve summarize the relationships used by the dynamic driving metric output platform 102 to solve for the distance, which is the objective of the calculation. As shown in FIG. 11, there is an additional useful relationship, which provides an expression for the angle α as follows (equation thirteen):

$$\text{Tan}(\alpha) = \frac{p}{fl} \tag{13}$$

In applying equation thirteen to equation twelve, the dynamic driving metric output platform 102 may determine equation fourteen:

$$D = \frac{H \times (fl^2 - p \times d)}{fl \times (d + p)} \tag{14}$$

Figure 12:
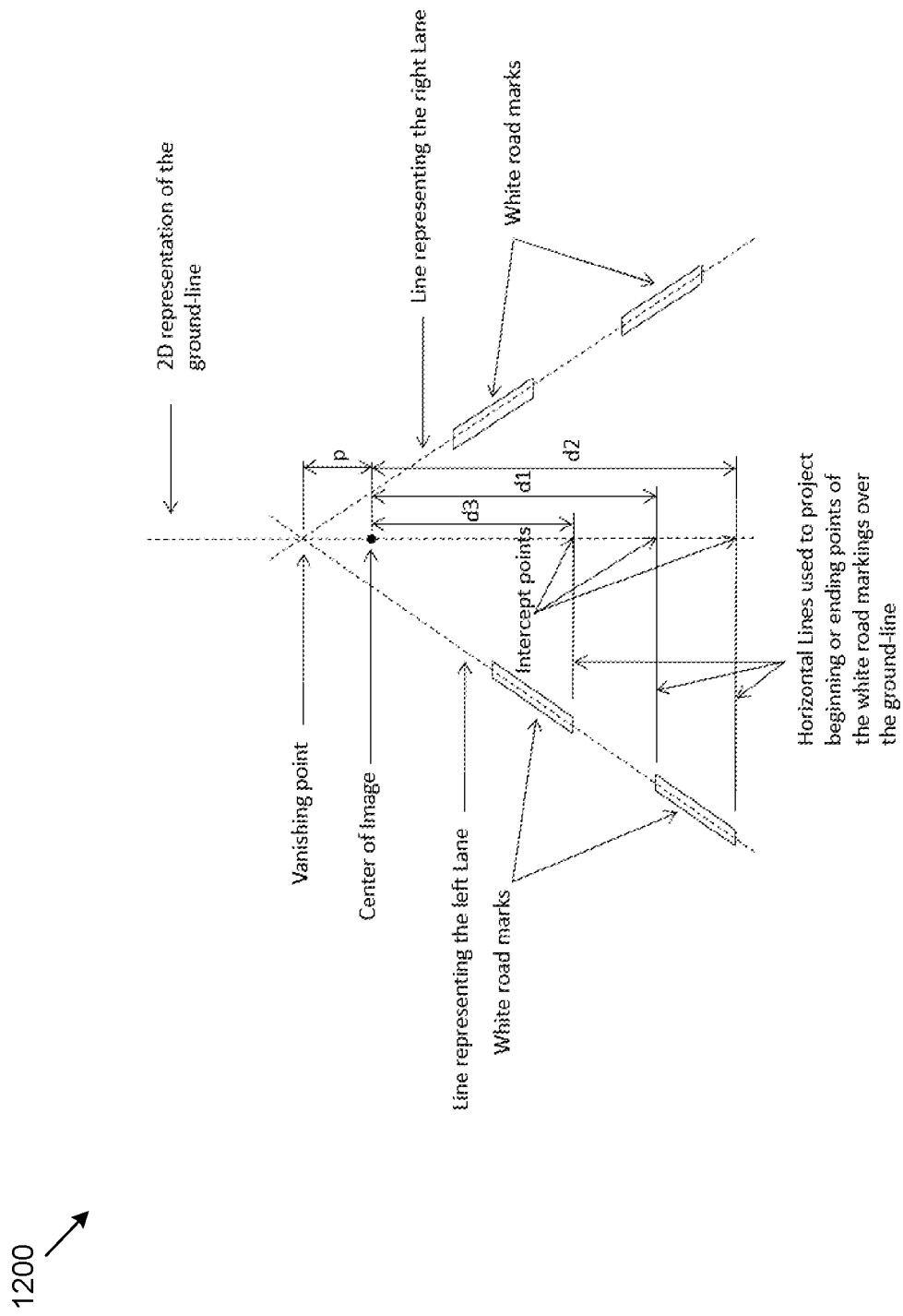

FIG. 12 shows a sketch 1200 of the same type of 2D scene shown in FIG. 10 for points aligned with the beginning and with the end of white road markings. However, in this instance, the video camera's 103 tilt angle may be non-zero. As FIG. 12 shows, the center of the image frame might not be collocated with the vanishing point.

Using the representation illustrated by FIG. 12 and applying the same criterion used before for the difference of distance between the points in the ground line aligned to the beginning and to the end of the white road marking, the dynamic driving metric output platform 102 may obtain the following relationship (equation fifteen):

$$D1 - D2 = \frac{H}{fl} \times \left( \frac{(fl^2 - p \times d1)}{(d1 + p)} - \frac{(fl^2 - p \times d2)}{(d2 + p)} \right) \quad (15)$$

As shown in equation fifteen, H and fl might not be a product anymore. Thus, the dynamic driving metric output platform 102 might not be able to obtain the value of H multiplied by fl and apply it to all the distance calculations as in equation nine. Therefore, in this instance, the dynamic driving metric output platform 102 may determine the values of H and fl individually. Accordingly, equation fifteen may be better expressed in terms of the angle α than the focal length. After applying equation thirteen to equation fifteen, the dynamic driving metric output platform 102 may obtain equation sixteen below in terms of H and α.

$$D1 - D2 = \quad (16)$$
$$\frac{H}{\operatorname{Tan}(\alpha)} \times \left( \frac{(p - (d1) \times (\operatorname{Tan}(\alpha))^2)}{(d1 + p)} - \frac{(p - (d2) \times (\operatorname{Tan}(\alpha))^2)}{(d2 + p)} \right)$$

Before getting into how equation sixteen may be used to obtain the values of H and α, two other important aspects of the method should be addressed which are the vanishing point and the value of which may be the distance between the point representing the horizon line and the middle of the image plane. In practice, the value of p may be calculated by the dynamic driving metric output platform 102 by obtaining the vanishing point on the image frame for all the lines that according to perspective projection should converge on the horizon. The dynamic driving metric output platform 102 may determine the vanishing point by using the same white road markings found through lane detection methods. In this instance, the dynamic driving metric output platform 102 may use any image frame obtained from the driving video received at step 207. There may be two white road markings on both sides and it may be straightforward for the dynamic driving metric output platform 102 to detect both of them through lane detection methods. The dynamic driving metric output platform 102 may then find the intersection of the lines representing the right and the left lane. The point where both projected lines intersect may be the vanishing point and thus the dynamic driving metric output platform 102 may have found the point in the image frame representing the horizon line. Even if only one set of white road markings is available, the dynamic driving metric output platform 102 may find sets of lines that are parallel on the ground plane and that intersect on the 2D image. For instance, the road may have a visible border that may be detected through computer vision methods. The dynamic driving metric output platform 102 may use this border with one set of white road markings (e.g., left or right markings) to find the intersection of the road border with the line representing the lane (e.g., for the visible white road markings). Accordingly, in some instances, the dynamic driving metric output platform 102 might not use the other set of white road markings to determine the vanishing point. There may be multiple ways for the dynamic driving metric output platform 102 to determine the vanishing point from the image frame.

In some instances, the dynamic driving metric output platform 102 might determine the distance p by calculating the difference between the y-coordinate of the vanishing point mentioned above and the y-coordinate of the middle of the image frame. Based on FIG. 12, the dynamic driving metric output platform 102 is able to measure d1 and d2 and may store a value for D1-D2 of ten feet. Therefore, at this point except for H and α all the other values on equation sixteen may have been previously determined by the dynamic driving metric output platform 102. To find the values of H and α, the dynamic driving metric output platform 102 may perform an exhaustive search (e.g., a numerical optimization method) in order to find the possible combination of these values that may minimize the error obtained by calculating the absolute difference between D1-D2 and the value of ten (given that D1-D2 should be ten feet). Therefore, for the implementation of the exhaustive search the dynamic driving metric output platform 102 may select a combination of H and α values and may determine the actual value of the difference between D1-D2 and ten for this combination. Here, the dynamic driving metric output platform 102 may determine D1-D2 by invoking equation sixteen above. The corresponding error generated by this combination is obtained by the dynamic driving metric output platform 102 as follows (equation seventeen):

$$\text{Error} = \operatorname{abs}(D1 - D2 - 10) \quad (17)$$

In applying equation seventeen, the dynamic driving metric output platform 102 may use the absolute value of the difference to generate the error. After all the combinations of H and α values are processed by the dynamic driving metric output platform 102, the dynamic driving metric output platform 102 may generate a list of errors corresponding each to a different combination. The dynamic driving metric output platform 102 may then select a combination as the solution of the exhaustive search by determining which one generated the minimum error across the list.

The dynamic driving metric output platform 102 may set the range for the search of H between two and four, which represents two feet and four feet respectively (e.g., this represents the range of heights for camera mounting on the dash board or the windshield of a vehicle). The dynamic driving metric output platform 102 may set the range for the search of a between zero and twenty degrees (the actual tilt angle is expected to be much lower than twenty degrees). The dynamic driving metric output platform 102 may set the step size for the search at 0.1 for H and 0.1 for α.

In some instances, the dynamic driving metric output platform 102 may include two consecutive white road markings when performing the exhaustive search. In this instance, the dynamic driving metric output platform 102 may improve the accuracy of the exhaustive search by incorporating as input the distance corresponding to the beginning of the next white road marking, which is designated on FIG. 9 as D3. In this instance, this white road marking is thirty feet apart from the end of the current white road marking. In this instance, the 2D distance corresponding to D3 according to the perspective divide calculation is designated as d3, which is illustrated in FIG. 12. To account for D3 and d3, the dynamic driving metric output platform 102 may modify equation sixteen as follows (equation eighteen):

$$D3 - D1 = \quad (18)$$
$$\frac{H}{\operatorname{Tan}(\alpha)} \times \left( \frac{(p - (d3) \times (\operatorname{Tan}(\alpha))^2)}{(d3 + p)} - \frac{(p - (d1) \times (\operatorname{Tan}(\alpha))^2)}{(d1 + p)} \right)$$

In some instances, the dynamic driving metric output platform 102 may incorporate equation eighteen into the exhaustive search computation, and may change the error function as follows (equation nineteen):

$$\text{Error} = \text{abs}(D1-D2-10) + \text{abs}(D3-D1-30) \quad (19)$$

Thus, the dynamic driving metric output platform 102 may apply equation sixteen above to the exhaustive search and this error function (or objective function) may weight equally the two individual contributors to the error (the two contributors are the absolute differences). The ranges for the search may be the same as the ones mentioned above. The only thing that changes in this instance may be the error function. At each point in the search, the dynamic driving metric output platform 102 may compute D1-D2 using equation sixteen and may compute D3-D1 from equation eighteen.

After application of the exhaustive search, the dynamic driving metric output platform 102 may obtain the combination of H and α values that minimize the error expressed by equation nineteen. After obtaining α, the dynamic driving metric output platform 102 may use equation thirteen to obtain the focal length fl. This completes the method and the dynamic driving metric output platform 102 may estimate the focal length fl, height H, and tilt angle α. Once the dynamic driving metric output platform 102 obtains these parameters, the dynamic driving metric output platform 102 may apply equation fourteen to obtain the distance to any point over the ground line in front of the vehicle.

The method described above may rely on one set of white road markings (the left white road markings for the cases illustrated on FIGS. 8-12). It may be possible to include the white road markings over the right to increase accuracy. Similarly, the method to estimate H and α described above may use only one image frame from the driving video. The method may be extended to use multiple image frames in which case the dynamic driving metric output platform may apply regression methods in order to find the H and α values that would minimize the overall error over all the image frames used. This may increase the robustness of the estimation method.

At step 226, the dynamic driving metric output platform 102 may generate driving metric output information and one or more commands directing the accident analysis platform 105 to cause display of a driving metric output interface based on the driving metric output information. In some instances, the driving metric output information may correspond to the vertical distance determined at step 225. Additionally or alternatively, the driving metric output information may include the speed determined at step 215. It should be understood that the calculation of a distance may be performed in addition to or in lieu of the speed determination previously discussed.

At step 227, the dynamic driving metric output platform 102 may send the driving metric output information and the one or more commands directing the accident analysis platform 105 to cause display of the driving metric output interface based on the driving metric output information. In some instances, the dynamic driving metric output platform 102 may send the driving metric output information and the one or more commands directing the accident analysis platform 105 to cause display of the driving metric output interface based on the driving metric output information via the communication interface 113 and while the second wireless data connection is established.

At step 228, the accident analysis platform 105 may receive the driving metric output information and the one or more commands directing the accident analysis platform 105 to cause display of the driving metric output interface based on the driving metric output information. In some instances, the accident analysis platform 105 may receive the driving metric output information and the one or more commands directing the accident analysis platform 105 to cause display of the driving metric output interface based on the driving metric output information while the second wireless data connection is established.

Figure 2G:
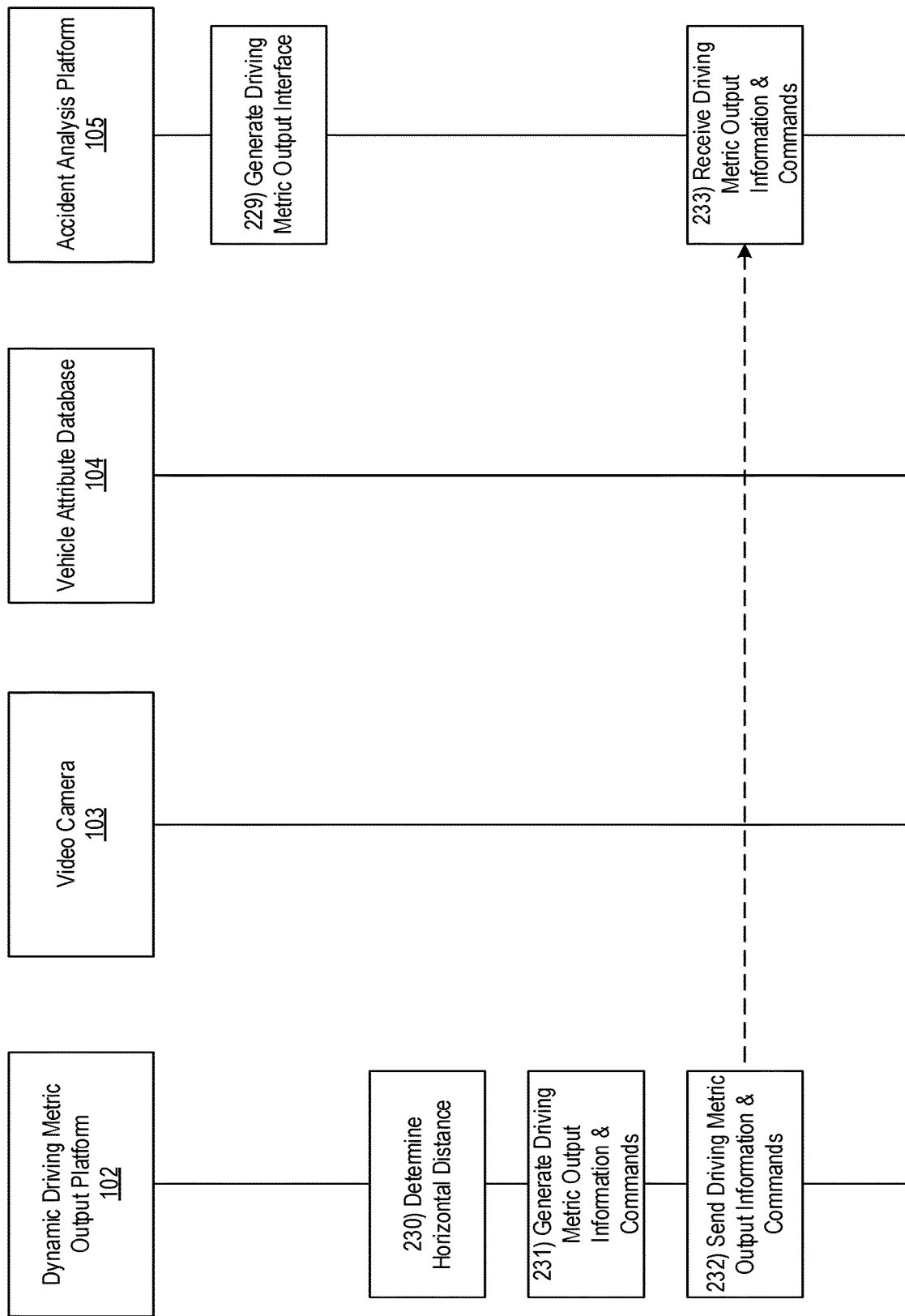
Figure 13:
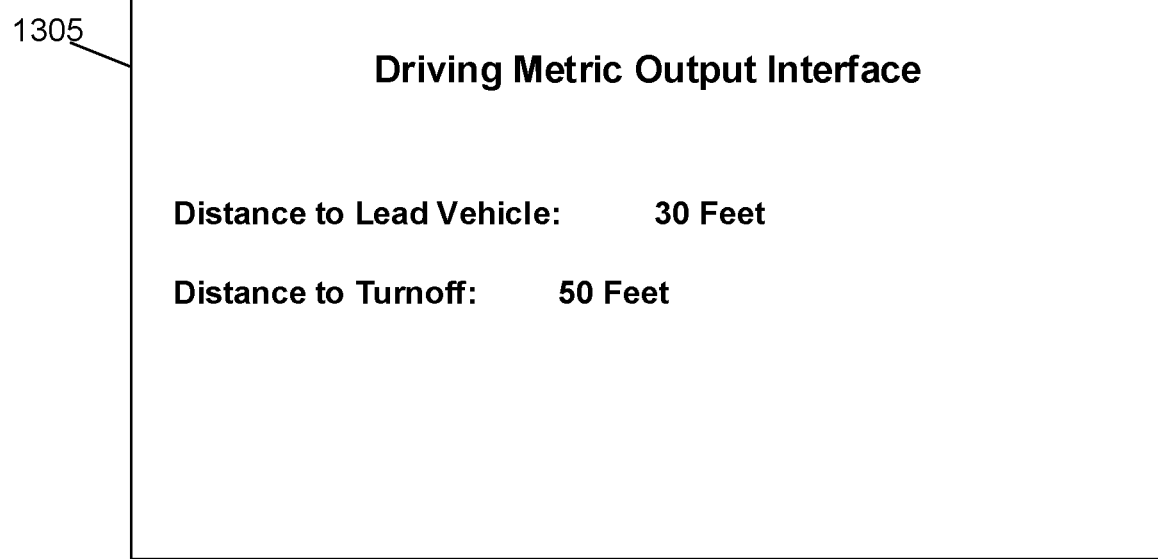
FIG. 13 depicts a graphical user interface for a dynamic driving metric output platform that utilizes improved computer vision methods in accordance with one or more example arrangements discussed herein.

Referring to FIG. 2G, at step 229, the accident analysis platform 105 may generate the driving metric output interface and may cause display of the driving metric output interface via a display of the accident analysis platform 105. In causing display of the driving metric output interface, the accident analysis platform 105 may generate an interface similar to graphical user interface 1305, which is shown in FIG. 13. For example, graphical user interface 1305 may indicate a distance between the ego vehicle and one or more other vehicles, obstructions, objects, infrastructure, or the like. In some instances, graphical user interface 1305 may be a graphical overlay on additional content (e.g., the video footage).

At step 230, the dynamic driving metric output platform 102 may determine one or more horizontal distances. For example, step 229 describes calculation of distances of points in the ground line that belongs to the bisecting plane that goes through the middle of the image plane. For all the other points on the ground plane, the dynamic driving metric output platform 102 may extend the distance calculation by applying the perspective divide method described herein. Extension of this distance calculation is described with regards to step 230. It should be understood that horizontal distances may be determined by the dynamic driving metric output platform 102 in addition to or in lieu of the calculated speeds and vertical distances described above. In some instances, there may be a camera tilt angle equal to zero. In other instances, there may be a camera tilt angle not equal to zero. In these instances, Euclidian geometry may be applied to extend the methods described herein.

From the exhaustive search methods described previously, the dynamic driving metric output platform 102 may obtain the focal length and the Height of the video camera 103. Up to this point, the dynamic driving metric output platform 102 performed all the perspective divide calculations over a vertical plane named the bisecting plane. Now armed with the focal length information (obtained from the exhaustive search method described previously), the dynamic driving metric output platform 102 may effectively perform these calculations horizontally instead of vertically. Therefore, the dynamic driving metric output platform 102 may calculate the real-world distance of any point in the ground plane. FIG. 13 illustrates the application of this method.

Figure 14:
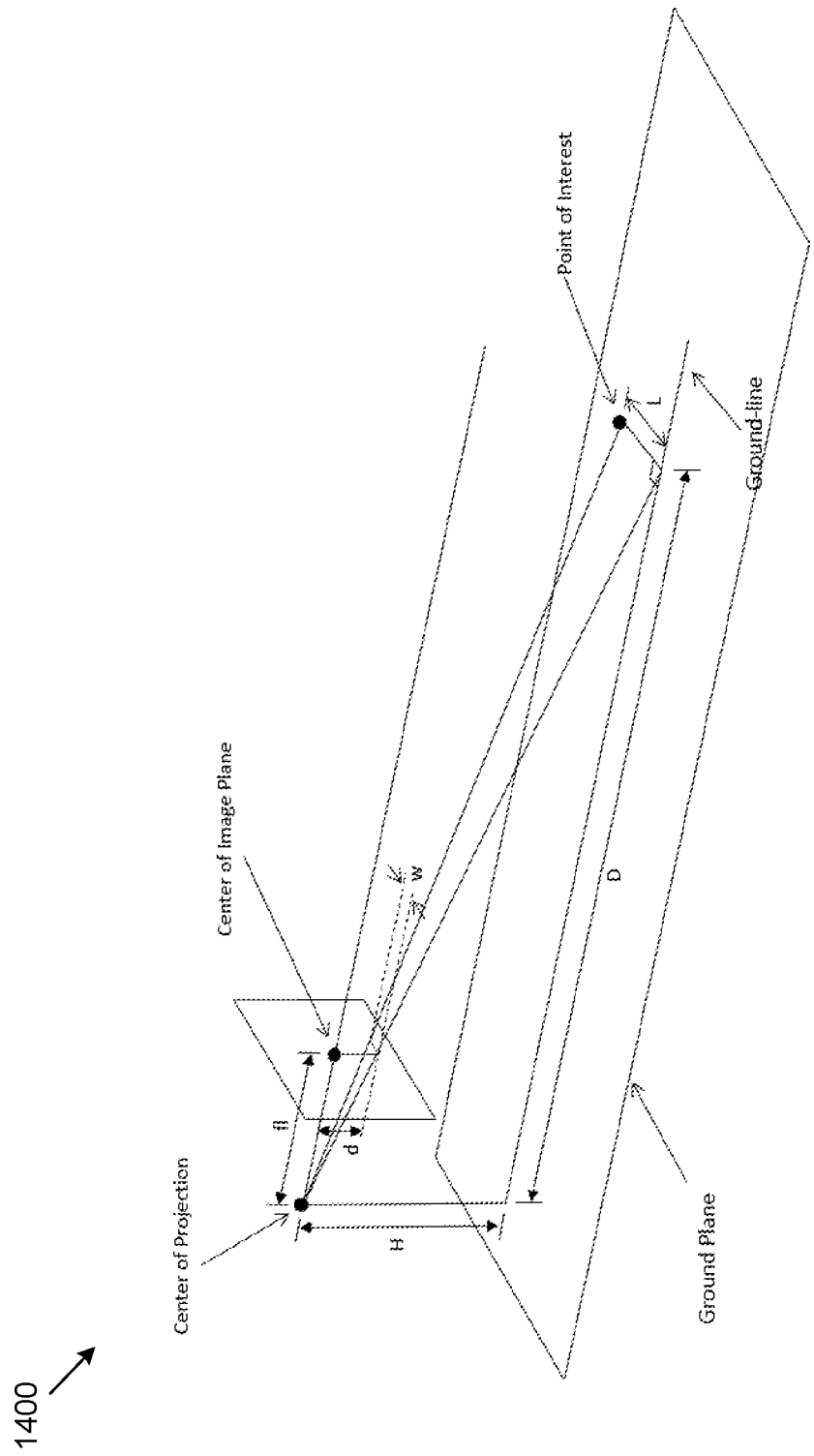
FIGS. 14 and 15 depict sketches for a dynamic driving metric output platform that utilizes improved computer vision methods in accordance with one or more example arrangements discussed herein.

FIG. 14 shows a sketch 1400 in which the point of interest is in the ground plane however this time it might not be located over the ground line. To calculate the distance from the video camera 103 to the point of interest, the dynamic driving metric output platform 102 may calculate the values of D and L. To obtain the value of D, the dynamic driving metric output platform 102 may perform an orthogonal projection from the point of interest to the ground line. The projected point allows the dynamic driving metric output platform 102 to define the distance D as FIG. 12 shows. From the methods outlined above, the dynamic driving metric output platform 102 may determine the values of D, H and fl. Therefore, the dynamic driving metric output platform 102 may calculate L. FIG. 14 shows that the line that connects the point of interest with the center of projection intercepts the image plane at a point that is located w pixels away from the center of the image plane. Applying perspective divide calculations to the triangles that include the sides with length w and length L, the dynamic driving metric output platform 102 determines the following relationship (equation twenty):

$$L = \frac{w \times D}{fl} \quad (20)$$

As described above, the distances measured over the ground-plane were considered from the point in the ground plane that corresponded to the position of the video camera 103 (the center of projection has its own projection on the ground plane and the dynamic driving metric output platform 102 used this projection to establish distances over the ground line previously). With the knowledge of L and D, the dynamic driving metric output platform 102 may determine the distance over the ground plane of the video camera 103 to the point of interest which becomes $\sqrt{D^2+L^2}$ (more precisely it may be the distance between the orthogonal projection of the center of projection over the ground plane to the point of interest which may also be over the ground plane). In some instances, the dynamic driving metric output platform 102 may attempt to determine a distance between the center of projection and the point of interest. In these instances, the point of interest value may be $\sqrt{D^2+L^2+H^2}$.

Figure 15:
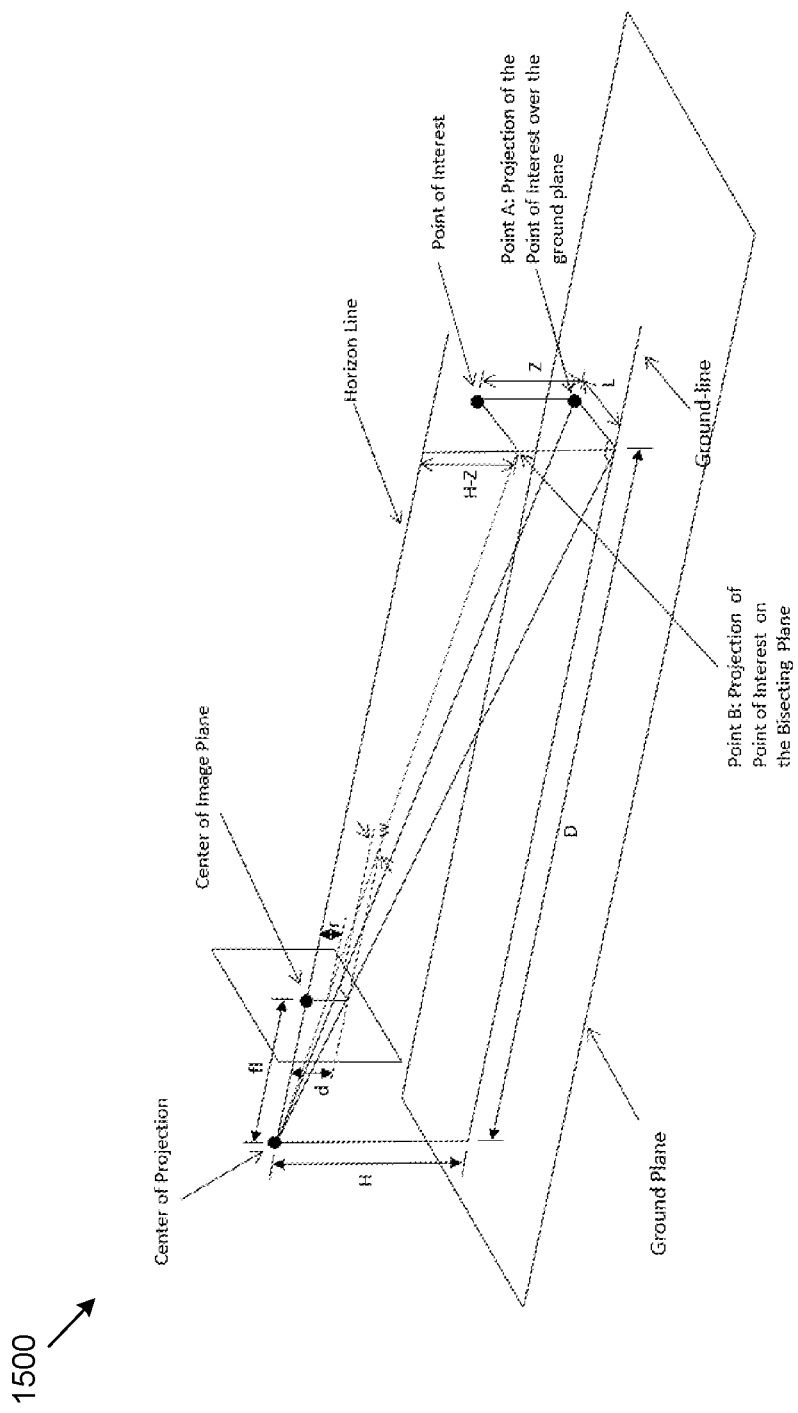

The development illustrated in FIG. 14 may be extended to incorporate points of interest that might not be located in the ground plane. FIG. 15 shows a sketch 1500 of a point of interest that is at a distance Z (e.g., in feet) above the ground plane. FIG. 14 shows the general case of any point of interest that may be located anywhere in the 3D space in front of the video camera 103. As long as the dynamic driving metric output platform 102 can find the orthogonal projection of such point of interest above over the ground plane, the dynamic driving metric output platform 102 may find the distance of the video camera's 103 center of projection to such point of interest located anywhere on 3D space. The 2D representation of such orthogonal projection over the ground plane can be obtained through computer vision methods (for instance if the point of interest is the centroid of a traffic sign in the road, the orthogonal projection of such centroid over the ground plane will be the point where the traffic sign's pole is attached to the road and this attachment point can be determined through computer vision object detection and image segmentation methods).

The procedure to obtain the distance from the video camera 103 to the point of interest is to first consider the point that results from the projection of the point of interest over the ground plane (point A). The dynamic driving metric output platform 102 may project point A over the ground line and the point resulting from this projection may define the distance D in the same way shown in FIG. 14. The methods outlined above may be used to determine D, H and the focal length fl. The procedure explained above in connection with FIG. 14 and equation twenty can be used by the dynamic driving metric output platform 102 to obtain L. The remaining part is to calculate the distance Z above the ground plane.

To determine Z the dynamic driving metric output platform 102 may first project the point of interest over the bisecting plane as FIG. 15 shows (point B). For a distance Z that is lower than H the projection point B may be at a distance H−Z below the horizon line. The line that connects the center of projection to point B may intercept the image plane at a distance r below the horizon line. The dynamic driving metric output platform 102 may use triangles defined over the bisecting plane that include the sides with length r and length H−Z to define the following relationship (equation twenty one):

$$H - Z = \frac{r \times D}{fl} \quad (21)$$

Therefore, since the dynamic driving metric output platform 102 knows H, it may use equation twenty one to determine Z. Based on D, L and Z, the dynamic driving metric output platform 102 may obtain the distance between the center of projection and the point of interest as: $\sqrt{D^2+L^2+(H-Z)^2}$. This completes the procedure and based on all the relationships derived the dynamic driving metric output platform may have the ability to determine distances to any point in 3D space in front of the ego-vehicle.

At step 231, the dynamic driving metric output platform 102 may generate driving metric output information and one or more commands directing the accident analysis platform 105 to cause display of a driving metric output interface based on the driving metric output information. In some instances, the driving metric output information may be the distance to the point of interest determined at step 230. In some instances, this driving metric output information may be determined in addition to or in lieu of previously determined driving metric output information.

At step 232, the dynamic driving metric output platform 102 may send the driving metric output information and the one or more commands directing the accident analysis platform 105 to cause display of the driving metric output interface based on the driving metric output information. In some instances, the dynamic driving metric output platform 102 may send the driving metric output information and the one or more commands directing the accident analysis platform 105 to cause display of the driving metric output interface based on the driving metric output information via the communication interface 113 and while the second wireless data connection is established.

At step 233, the accident analysis platform 105 may receive the driving metric output information and the one or more commands directing the accident analysis platform 105 to cause display of the driving metric output interface based on the driving metric output information. In some instance, the accident analysis platform 105 may receive the driving metric output information and the one or more commands directing the accident analysis platform 105 to cause display of the driving metric output interface based on the driving metric output information while the second wireless data connection is established.

Figure 2H:
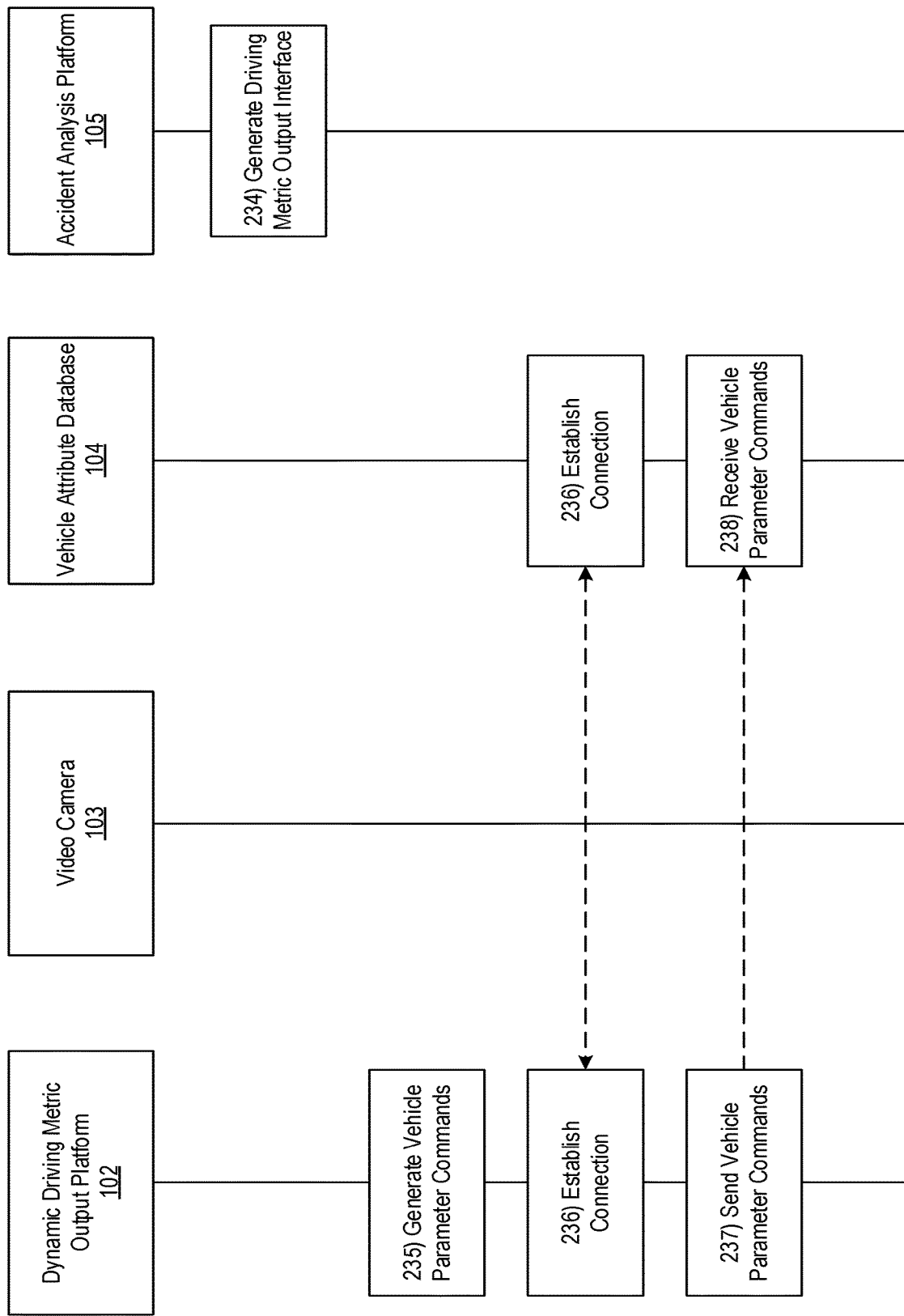
Figure 21:
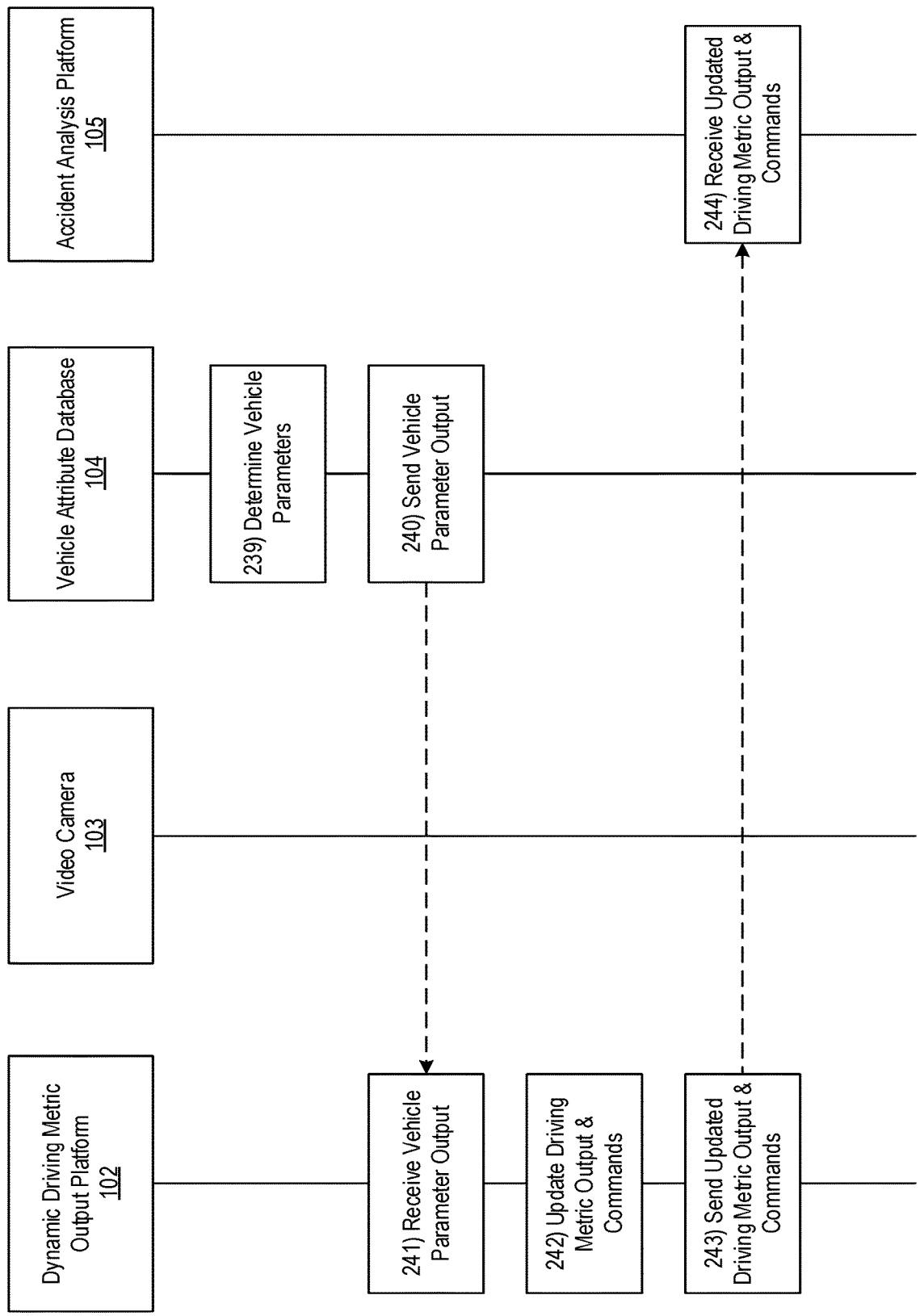

Referring to FIG. 2H, at step 234, the accident analysis platform 105 may generate and display a driving metric output interface. In some instances, in displaying the driving metric output interface, the accident analysis platform 105 may cause display of a graphical user interface similar to graphical user interface 1605, as shown in FIG. 16. For example, the accident analysis platform 105 may display a distance to the point of interest. In some instances, the graphical user interface 1605 may be an overlay over existing content (e.g., the video footage). In some instances, the graphical user interface 1605 may include additional driving metrics, such as a previously calculated speed or distance.

The methods outlined above for distance estimation of points of interest over the ground plane may be used to determine distances between the video camera's 103 center of projection and any object that has physical contact with the ground plane. Examples of such objects includes telephone poles, light poles, traffic light poles, traffic sign poles, pedestrians and of course other vehicles. In case of other vehicles, the distance estimation may provide the distance between the plane of the video camera 103 and the plane that represents the back of the vehicle in front of the video camera 103. The 2D representation of the back of the vehicle may be the actual bounding box that is provided by several of the deep learning based object detection methods available. Thus, distance determination for vehicles may be provided as illustrated by sketch 1700 in FIG. 17.

Figure 17:
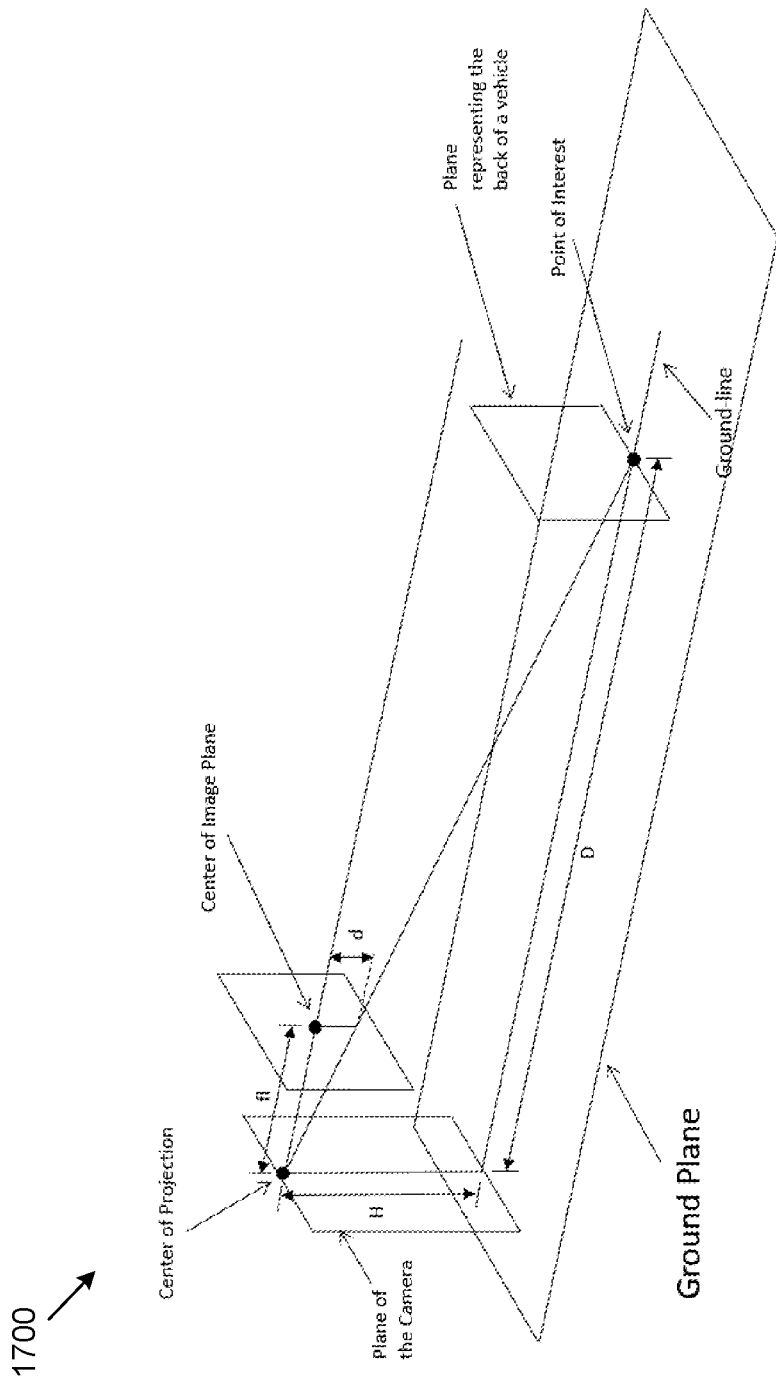
FIG. 17 depicts a sketch for a dynamic driving metric output platform that utilizes improved computer vision methods in accordance with one or more example arrangements discussed herein.

FIG. 17 is similar to FIG. 7 with the addition of a plane representing the back of a vehicle and also a plane that represents the plane of the video camera 103 (this plane contains the center of projection). As shown in FIG. 17, the plane of the video camera 103 may be parallel to the image plane and parallel to the plane representing the back of the vehicle (the three planes mentioned may be orthogonal to the ground plane). Therefore, the method to determine distances to points of interest in the ground plane allows the dynamic driving metric output platform 102 to simultaneously determine distances between the plane of the video camera 103 and the plane representing the back of the vehicle in front of the video camera 103.

In some instances, the vehicle in front of the video camera 103 might not be at a location such that the ground line intercepts the plane representing the back of this vehicle. In other words, the vehicle may be in a lane that is adjacent to the one where the ego-vehicle is driving (lane in this context means the traffic lane where one single vehicle fits). In this instance, the dynamic driving metric output platform 102 may still determine the distances between the plane of the video camera 103 and the plane of the back of the vehicle in the adjacent lane using the same methods. In this last instance, the dynamic driving metric output platform 102 may extend horizontally the plane representing the back of the vehicle in the adjacent lane until this plane is intercepted by the ground line. Then the point of interception may become the point of interest and the dynamic driving metric output platform 102 may calculate the distance to such point. Thus, the dynamic driving metric output platform 102 may obtain the distance from the plane of the video camera 103 to the plane representing the back of the vehicle in the adjacent lane.

In one or more instances, the dynamic driving metric output platform 102 may determine the lateral distance to such vehicle in the adjacent lane, since the method described in the paragraph above provides longitudinal distance (which is the distance in the direction of travel). In one or more instances, this may depend on how to account for the position of the vehicle in the adjacent lane. If lateral distance is considered as the distance to the side of the vehicle then the dynamic driving metric output platform 102 may determine from the computer vision object detection method (or deep learning based method) any point on the side of the vehicle and then project such point over the ground plane. The projected point may become the point of interest and the dynamic driving metric output platform 102 may calculate the distance L using the procedure illustrated by FIG. 14 and described by equation twenty. Distance L may then become the lateral distance.

Similar procedures to the one described above for distance determination of surrounding vehicles may be used to determine distances to pedestrians, bicyclists, traffic light poles, etc. Additionally, given the fact that the dynamic driving metric output platform 102 may determine relative distances between the ego-vehicle and surrounding vehicles we may have an alternate method to determine relative speed (in addition to the method described in steps 208-215) by dividing the difference in distances from one frame to the next by the time in seconds that elapses between frames. This method is further described below. Similarly, relative acceleration may be determined by dividing the relative speeds calculated between two frames by the time in seconds that elapses between frames. Lateral relative speed may be similarly calculated using relative lateral distance and lateral acceleration may be obtained from lateral relative speed. Absolute speed (longitudinal and lateral) may be obtained for all vehicles by adding vectorially the absolute speed of the ego-vehicle to the relative speed of the surrounding vehicle. Absolute acceleration of the surrounding vehicle may be similarly obtained by adding vectorially the absolute acceleration of the ego-vehicle to the relative acceleration of the surrounding vehicle.

In some embodiments, distance may be measured from the plane of the video camera 103. Additionally or alternatively, the distance from the front of the ego-vehicle to the back of the surrounding vehicle may be obtained by subtracting the length of the front part of the car from the distance as originally calculated. The length of the front part of the car may be estimated in average to be five feet (this is effectively the distance between the windshield and the front of the vehicle). Additionally, if the vehicle model is known then the particular length may be introduced in the calculations. In some instances, the dynamic driving metric output platform 102 may generate one or more commands directing a vehicle attribute database 104 to provide the particular length based on the vehicle model. For instance, at step 235, the dynamic driving metric output platform 102 may receive generate one or more commands directing the vehicle attribute database 104 to determine the vehicle parameters. In some instances, the calculations of speed and accelerations might not be influenced by this modification to the calculation of distance.

At step 236, the dynamic driving metric output platform 102 may establish a connection with the vehicle attribute database 104. For example, the dynamic driving metric output platform 102 may establish a third wireless data connection with the vehicle attribute database 104 to link the vehicle attribute database 104 to the dynamic driving metric output platform 102.

At step 237, the dynamic driving metric output platform 102 may send the one or more commands directing the vehicle attribute database 104 to provide the particular length based on the vehicle model. In some instances, the dynamic driving metric output platform 102 may send the one or more commands directing the vehicle attribute database 104 to provide the particular length based on the vehicle model via the communication interface 113 and while the third wireless data connection is established.

At step 238, the vehicle attribute database 104 may receive the one or more commands directing the vehicle attribute database 104 to provide the particular length based on the vehicle model. In some instances, the vehicle attribute database 104 may receive the one or more commands directing the vehicle attribute database 104 to provide the particular length based on the vehicle model while the third wireless data connection is established.

With reference to FIG. 2I, at step 239, the vehicle attribute database 104 may determine particular length. For example, the vehicle attribute database 104 may maintain an index based on vehicle make, model, identification number, or the like, and may index the vehicle to determine the length corresponding to a distance between the windshield and the front of the vehicle.

At step 240, the vehicle attribute database 104 may then send, to the dynamic driving metric output platform 102, a vehicle parameter output corresponding to the particular length. In some instances, the vehicle attribute database 104 may send the vehicle parameter output while the third wireless data connection is established.

At step 241, the dynamic driving metric output platform 102 may receive the vehicle parameter output from the vehicle attribute database 104. In some instances, the dynamic driving metric output platform 102 may receive the vehicle parameter output from the vehicle attribute database 104 via the communication interface 113 and while the third wireless data connection is established.

At step 242, the dynamic driving metric output platform 102 may update the driving metric output. In some instances, the dynamic driving metric output platform 102 may update the driving metric output by subtracting the particular length from the distance determined. In addition, the dynamic driving metric output platform 102 may generate one or more commands directing the accident analysis platform 105 to update the driving metric interface based on the updated distance.

At step 243, the dynamic driving metric output platform 102 may send the updated driving metric output and the one or more commands directing the accident analysis platform 105 to update the driving metric interface based on the updated distance. In some instances, the dynamic driving metric output platform 102 may send the updated driving metric output and the one or more commands directing the accident analysis platform 105 to update the driving metric interface based on the updated distance while the second wireless data connection is established and via the communication interface 113.

At step 244, the accident analysis platform 105 may receive the updated driving metric output and the one or more commands directing the accident analysis platform 105 to update the driving metric interface based on the updated distance. In some instances, the accident analysis platform 105 may receive the updated driving metric output and the one or more commands directing the accident analysis platform 105 to update the driving metric interface based on the updated distance while the second wireless data connection is established.

Referring to FIG. 2J, at step 245, based on the received commands and the updated driving metric output, the accident analysis platform 105 may generate and display an updated driving metric interface. In displaying the updated driving metric interface, the accident analysis platform 105 may cause display of a graphical user interface similar to graphical user interfaces 1305 and 1605, which are described above. In some instances, the graphical user interface may be generated in addition to or in lieu of previously described graphical user interfaces.

At step 246, the dynamic driving metric output platform 102 may determine an updated vehicle speed. After determining relative distances to objects in front of the ego-vehicle, the dynamic driving metric output platform 102 may determine vehicle speed in an alternative method to the absolute speed determination method described above at steps 208-215. Previously the absolute speed determination was based on a 2D marker that the dynamic driving metric output platform 102 used to establish time stamps from events when the marker touched the beginning and the end of white road markings. Now the dynamic driving metric output platform 102 has the ability use, for example, the beginning of any white road marking and determine the longitudinal distance (e.g., the distance of the plane of the video camera 103 to the projection of the beginning of the white road marking over the ground line) to such beginning. The dynamic driving metric output platform 102 may obtain the difference of relative longitudinal distances to the beginning of the same white road marking between two frames and then may estimate absolute speed by dividing this difference by the time in seconds that elapses between two consecutive image frames. In other words, the dynamic driving metric output platform 102 may determine now absolute ego-vehicle speed with just two consecutive image frames and might not wait for any 2D marker to touch the other end of the white road marking. This may provide greater resolution and flexibility to the absolute speed estimation. Instead of using the beginning of the white road marking, the dynamic driving metric output platform 102 may similarly use the end of the white road marking or any reference point for that matter. Additionally, even if white road markings are not available, the dynamic driving metric output platform 102 may use any reference point on other pavement markings such as the word "STOP" written on the pavement, or the word "ONLY" written on the pavement, or the arrows signs in the pavement (FIGS. 3A-3B show the dimensions of some of these other pavement markings) and as mentioned above the predefined dimensions of these other pavement markings can be used to extract the camera parameters such as focal length, camera height and tilt angle. Furthermore, any object in the scene that has physical contact with the ground plane may be used to determine the difference of relative distances to such object from one image frame to the next. For instance, the dynamic driving metric output platform 102 may can determine longitudinal distances to public light poles, to traffic light poles, to telephone poles and may use the difference in distances between image frames to determine absolute speed in a similar way to that described above with regards to the white road markings. The detection of all these poles may be provided by computer vision object detection methods (including deep learning based methods). Any static object that may be detected on the street/road may be used to determine absolute speed. As described above, the updated speed may be sent to the accident analysis platform 105 for display.

It should be understood that the presence of the white road markings allows the dynamic driving metric output platform 102 not only to extract the camera parameters, but also to provide valuable references for the real-life distances that correspond to the scene in front of the vehicle. The white road markings that come at far away distances may be used as references to provide a correction factor to the distance estimation method presented in this invention. Since it is known that the distance between white road markings is always thirty feet, this information may be used to provide correction for perspective distortion.

Subsequently, the example event sequence may end, and dynamic driving metric output platform may continue to generate dynamic driving metric outputs in a similar manner as discussed above (e.g., by receiving video footage from a vehicle mounted camera, extrapolating information from the video footage, calculating driving metrics, and directing the accident analysis platform 105 to generate various interfaces to display the metrics). By operating in this way, dynamic driving metric output platform 102 may improve the quality of driving metrics to increase driver safety as well as the quality of metrics available for driver analysis.

Figure 18:
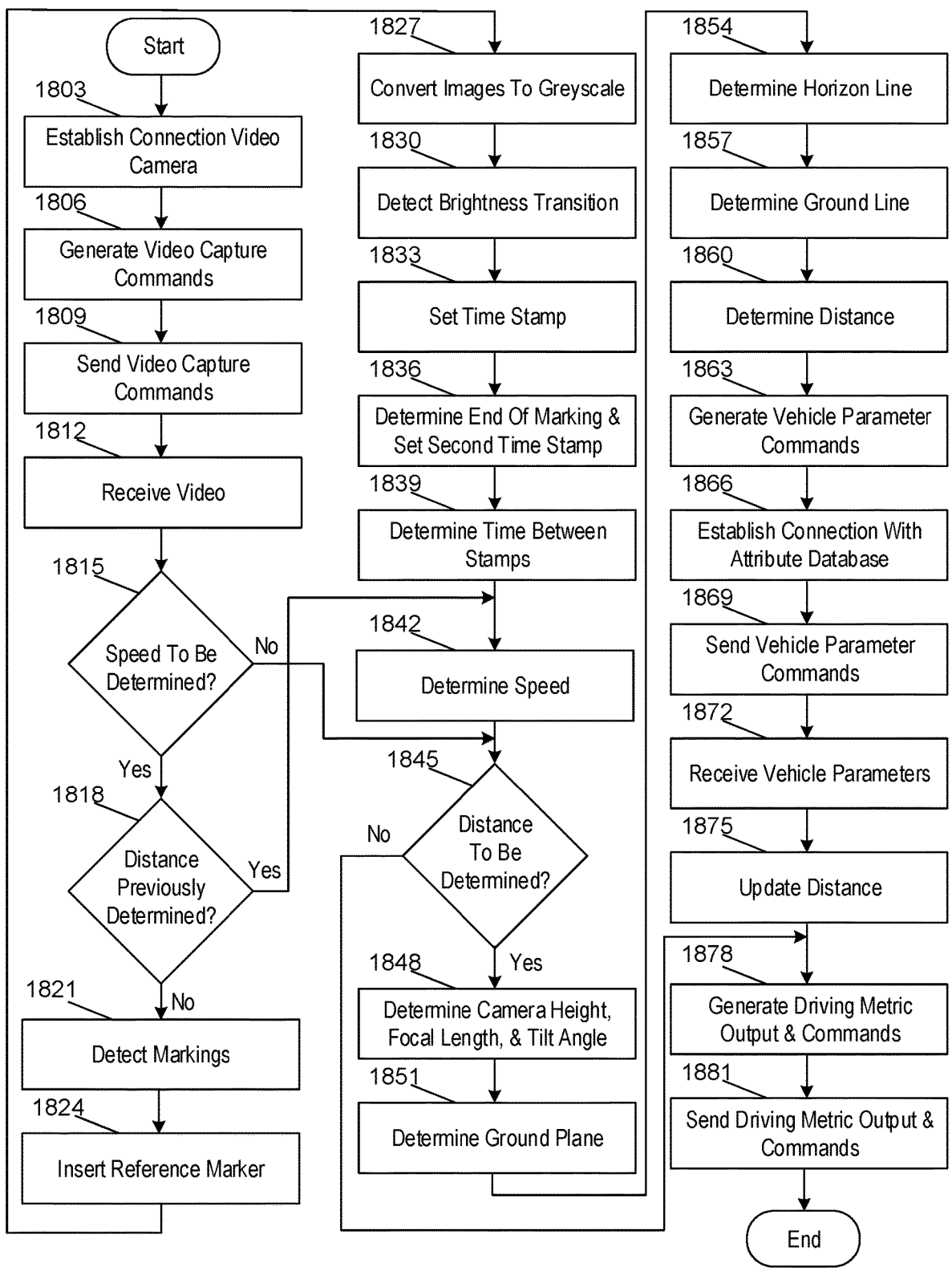
FIG. 18 depicts an illustrative method for deploying a dynamic driving metric output platform that utilizes improved computer vision methods in accordance with one or more example arrangements discussed herein.

FIG. 18 depicts an illustrative method for deploying a dynamic driving metric output platform that utilizes improved computer vision methods to determine driving metrics in accordance with one or more example embodiments. Referring to FIG. 18, at step 1803, the dynamic driving metric output platform may establish a connection with a video camera. At step 1806, the dynamic driving metric output platform may generate one or more commands directing the video camera to capture video footage. At step 1809, the dynamic driving metric output platform may send the one or more commands directing the video camera to capture the video footage. At step 1812, the dynamic driving metric output platform may receive the video footage. At step 1815, the dynamic driving metric output platform may determine whether a speed output should be determined. If a speed output should not be determined, the dynamic driving metric output platform may proceed to step 1845. If a speed output should be determined, the dynamic driving metric output platform may proceed to step 1818.

At step 1818, the dynamic driving metric output platform may determine whether a distance was previously determined. If a distance was previously determined, the dynamic driving metric output platform may proceed to step 1842. If a distance was not previously determined, the dynamic driving metric output platform may proceed to step 1821.

At step 1821, the dynamic driving metric output platform may detect road markings in the video footage. At step 1824, the dynamic driving metric output platform may insert a reference marker into the video footage. At step 1827, the dynamic driving metric output platform may convert the video footage images to greyscale. At step 1830, the dynamic driving metric output platform may detect a brightness transition in the video footage images. At step 1833, the dynamic driving metric output platform may set a time stamp in response to detecting the brightness transition. At step 1836, the dynamic driving metric output platform may determine the end of the marking and set an additional time stamp. At step 1839, the dynamic driving metric output platform may determine an amount of time between the time stamps. At step 1842, the dynamic driving metric output platform may determine the vehicle speed. At step 1845, the dynamic driving metric output platform may determine whether a distance should be determined. If the dynamic driving metric output platform determines that a distance should not be determined, the dynamic driving metric output platform may proceed to step 1878. If the dynamic driving metric output platform determines that a distance should be determined, the dynamic driving metric output platform may proceed to step 1848.

At step 1848, the dynamic driving metric output platform may determine a video camera height, a focal length, and a tilt angle. At step 1851, the dynamic driving metric output platform may determine a ground plane in the video footage. At step 1854, the dynamic driving metric output platform may determine a horizon line in the video footage. At step 1857, the dynamic driving metric output platform may determine a ground line in the video footage. At step 1860, the dynamic driving metric output platform may determine a distance (e.g., vertical distance, horizontal distance, or a combination of the two). At step 1863, the dynamic driving metric output platform may generate one or more commands directing a vehicle attribute database to provide vehicle parameters. At step 1866, the dynamic driving metric output platform may establish a connection with the vehicle attribute database. At step 1869, the dynamic driving metric output platform may send the one or more commands directing the vehicle attribute database to provide vehicle parameters. At step 1872, the dynamic driving metric output platform may receive the vehicle parameter output. At step 1875, the dynamic driving metric output platform may update the distance determined based on the vehicle parameter output. At step 1878, the dynamic driving metric output platform may generate a driving metric output corresponding to the speed and/or distance and one or more commands directing an accident analysis platform to display the driving metric output. At step 1881, the dynamic driving metric output platform may establish a connection with the accident analysis platform and may send the driving metric output and the one or more commands directing the accident analysis platform to display the driving metric output.

It should be understood that all the methods presented herein have been described based on a camera mounted in the ego-vehicle and facing forward. The methods and the principles described herein may be extended to work with a camera facing backwards. Currently there are several parking assistance cameras mounted on the back of the cars running on U.S. roads (several car manufacturers install back cameras). The feed from these back cameras may be exploited by a system that implements the methods described herein and all the algorithms that use speed, distance, and acceleration estimation (for ego and surrounding vehicles) may thus be extended to include the data extracted from the scene behind the vehicle which may increase the coverage and predictive power of any algorithm/model that works with such data.

As previously mentioned, there are two primary arrangements described herein. One is to allow the extraction of speed, distance, and acceleration information from existing datasets of driving video so that researchers may use the data to train and validate their models. In this sense, one additional benefit is the ability to use videos available on the Internet showing dashboard camera footage of actual crashes. In this case, the researcher has priceless information about the different relative and absolute speeds, relative and absolute accelerations and all the relevant distances to all the surrounding vehicles for the seconds leading to the crash, besides having distances to relevant objects in the scene (distances to pedestrians for example). The information that may be extracted from footage of crashes is extremely valuable since these crashes might not be reproduced in laboratories or on other settings. Even if the crash is somehow staged (in a real-life setting, or through some software/simulation process that generates a crashing scenario) it may lack the human driver component and therefore the staging will lack the valuable component of the human reaction information on the seconds leading to the crash. The footage of crashes has involved the real-world risk and response of the driver of the ego-vehicle and therefor the ability to use this information for research is priceless and it is irreproducible. Accordingly, obtaining such information may improve overall vehicle and driving safety. As it stands today, this source of information has not been tapped by the research community because of the inability to extract the distance, speed and acceleration metrics.

The second major application is the ability to provide a real-time system on-board the ego-vehicle that allows the extraction of distance, speed, and acceleration information from just the camera, without requiring the user to set the camera at a specific height or to obtain focal length information from the camera. In several cameras, the focal length changes also with the resolution chosen for the video (the user could choose from a number of resolutions) so it may be an additional complication for the user to obtain the corresponding focal length information for the resolution setting he chooses. Further, a real-time system that implements the methods presented herein may detect through any computer vision based object detection method (including any deep learning based method) any of the pavement markings described above in order to extract the camera parameters. This may occur a few minutes after the system is turned-on for the first time. Once the system extracts the camera parameters from the pavement markings the system can start providing distance, speed and acceleration information immediately. Additional pavement markings found on the road may be used to further validate the extracted camera parameters such as height, focal length and camera tilt angle. In case of the pan angle, this may be used as an additional parameter of the exhaustive search method mentioned above and then the pan angle may be obtained. In this case, another vanishing point may be obtained by processing the intersection of the lines that are horizontal or near horizontal in the image frame. As previously mentioned, before the pan angle is reasonably assumed to be such that the plane of the camera and the image plane are parallel to the front of the ego-vehicle, and parallel at the same time to the back of the surrounding vehicles that move in the same direction as the ego-vehicle (this is considered a situation with a zero degrees pan angle).

Herein, the camera's tilt and pan angle are discussed without mention of the roll angle. The roll angle may be such that the image frame has zero rotation in which case the roofs of the vehicles in front horizontal or very close to being horizontal may be observed. If there is a roll angle that generates a non-zero rotation it may be corrected through image processing by detecting the angle of rotation (by measuring the deviation angle of the lines that are supposed to be horizontal on the scene) and applying a counter rotation with the same angle value to the whole image. In the typical case, the roll angle is such that there may be close to zero rotation.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Extensions of the applications for this invention include the detection of anomalous angle tilting on the camera which could indicate that the camera may be loose or in a non-optimal position and thus needs to be repositioned or remounted (this can be sent as an alert to the driver). Another extension involves the application of the principles of distance estimation provided for sports such as football where distances are manually measured using to determine yardage. In such cases the marks on the field can be used to determine camera parameters for any of the cameras pointing to the field and distance to objects can be determined by the method presented in this invention, which will render manual measures unnecessary. Bicyclist can benefit from the technology presented in this invention to exploit a camera mounted on their helmet so they can obtain speed and distance to objects information, as well as relative speed and relative acceleration of other objects in the vicinity. Finally, the methods of this invention can be used to assist blind people by exploiting the information obtained from a body camera that a blind person may carry. In this case when the blind person crosses the street the pavement markings on the crossing provide the necessary information to extract camera parameters and provide distance information to the blind person about the distance to the other end of the street. In several cases while the blind person walks on the side of the street any pavement marking can be used to obtain an update of the camera parameters and thus provide immediate distance information to the blind person for all the surrounding objects around.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive video footage from a vehicle camera, wherein the vehicle camera is located inside a vehicle, and wherein the video footage includes a point of interest that is a longitudinal distance (D) in front of the vehicle camera and a horizontal distance (L) to a side of the vehicle camera;
   determine, a height (H) of the vehicle camera corresponding to a height of the vehicle camera above a ground plane, a focal length (fl) for the vehicle camera corresponding to a distance between a center of projection and an image plane for the vehicle camera, and a vertical distance (d) between a middle point of the image plane and an intersection point of the image plane and a line connecting the center of projection and the point of interest on the ground plane;
   compute D based on H, fl, and d;
   determine a horizontal distance (w) between the middle point of the image plane and the intersection point of the image plane and the line connecting the center of projection and the point of interest on the ground plane;
   compute L based on w, D, and fl;
   compute, based on D and L, a distance between the vehicle and the point of interest;
   generate, based on the distance between the vehicle and the point of interest, driving metric output information and one or more commands directing an accident analysis platform to cause display of a driving metric output interface based on the driving metric output information; and
   send, to the accident analysis platform, the driving metric output information and the one or more commands directing the accident analysis platform to cause display of the driving metric output interface based on the driving metric output information, wherein sending the driving metric output information and the one or more commands directing the accident analysis platform to cause display of the driving metric output interface based on the driving metric output information causes the accident analysis platform to cause display of the driving metric output interface based on the driving metric output information.

2. The computing platform of claim 1, wherein determining H comprises determining h based on information received from a vehicle attribute database.

3. The computing platform of claim 1, wherein computing D comprises applying the following formula:

$$D = \frac{fl * H}{d}.$$

4. The computing platform of claim 1, wherein computing L comprises applying the following formula:

$$L = \frac{w * D}{fl}.$$

5. The computing platform of claim 1, wherein computing the distance between the vehicle and the point of interest comprises computing $\sqrt{D^2 + L^2}$.

6. The computing platform of claim 1, wherein:
   the vehicle is in a first lane, and
   the point of interest is a second vehicle in a second lane.

7. The computing platform of claim 1, wherein the point of interest is located a distance (Z) above the ground plane.

8. The computing platform of claim 7, wherein the memory stores additional computer-readable instructions that, when executed by the at least one processor, further cause the computing platform to:
   compute Z using the formula:

$$H - Z = \frac{r * D}{fl},$$

where r is a distance between a horizon line and an intersection between the image plane and a line connecting the center of projection to the point of interest.

9. The computing platform of claim 8, wherein computing the distance between the vehicle and the point of interest comprises computing $\sqrt{D^2 + L^2 + (H-Z)^2}$.

10. The computing platform of claim 1, wherein the memory stores additional computer-readable instructions that, when executed by the at least one processor, further cause the computing platform to:
    compute, using L, a lateral speed for the vehicle.

11. A method comprising:
    at a computing platform comprising at least one processor, a communication interface, and memory:
    receiving video footage from a vehicle camera, wherein the vehicle camera is located inside a vehicle, and wherein the video footage includes a point of interest that is a longitudinal distance (D) in front of the vehicle camera and a horizontal distance (L) to a side of the vehicle camera;
    determining, a height (H) of the vehicle camera corresponding to a height of the vehicle camera above a ground plane, a focal length (fl) for the vehicle camera corresponding to a distance between a center of projection and an image plane for the vehicle camera, and a vertical distance (d) between a middle point of the image plane and an intersection point of the image plane and a line connecting the center of projection and the point of interest on the ground plane;
    computing D using the formula:

$$D = \frac{fl * H}{d};$$

determining a horizontal distance (w) between the middle point of the image plane and the intersection point of the image plane and the line connecting the center of projection and the point of interest on the ground plane;

computing L using the formula:

$$L = \frac{w*D}{fl};$$

computing a distance between the vehicle and the point of interest by computing $\sqrt{D^2+L^2}$;

generating, based on the distance between the vehicle and the point of interest, driving metric output information and one or more commands directing an accident analysis platform to cause display of a driving metric output interface based on the driving metric output information; and sending, to the accident analysis platform, the driving metric output information and the one or more commands directing the accident analysis platform to cause display of the driving metric output interface based on the driving metric output information, wherein sending the driving metric output information and the one or more commands directing the accident analysis platform to cause display of the driving metric output interface based on the driving metric output information causes the accident analysis platform to cause display of the driving metric output interface based on the driving metric output information.

12. The method of claim 11, wherein determining H comprises determining h based on information received from a vehicle attribute database.

13. The method of claim 11, wherein:
the vehicle is in a first lane, and
the point of interest is a second vehicle in a second lane.

14. The method of claim 11, wherein the point of interest is located a distance (Z) above the ground plane.

15. The method of claim 14, further comprising:
computing Z using the formula:

$$H - Z = \frac{r*D}{fl},$$

where r is a distance between a horizon line and an intersection between the image plane and a line connecting the center of projection to the point of interest.

16. The method of claim 15, wherein computing the distance between the vehicle and the point of interest comprises computing $\sqrt{D^2+L^2+(H-Z)^2}$.

17. The method of claim 11, further comprising:
computing, using L, a lateral speed for the vehicle.

18. One or more non-transitory computer-readable media storing instructions that, when executed by a computing platform comprising at least one processor, a communication interface, and memory, cause the computing platform to:

receive video footage from a vehicle camera, wherein the vehicle camera is located inside a vehicle, and wherein the video footage includes a point of interest that is a longitudinal distance (D) in front of the vehicle camera and a horizontal distance (L) to a side of the vehicle camera;

determine, a height (H) of the vehicle camera corresponding to a height of the vehicle camera above a ground plane, a focal length (fl) for the vehicle camera corresponding to a distance between a center of projection and an image plane for the vehicle camera, and a vertical distance (d) between a middle point of the image plane and an intersection point of the image plane and a line connecting the center of projection and the point of interest on the ground plane;

compute D based on H, fl, and d;

determine a horizontal distance (w) between the middle point of the image plane and the intersection point of the image plane and the line connecting the center of projection and the point of interest on the ground plane;

compute L based on w, D, and fl;

compute, based on D and L, a distance between the vehicle and the point of interest;

computing, using L, a lateral speed for the vehicle;

generate, based on the distance between the vehicle and the point of interest, driving metric output information and one or more commands directing an accident analysis platform to cause display of a driving metric output interface based on the driving metric output information, wherein the driving metric output information includes the lateral speed and the distance between the vehicle and the point of interest; and send, to the accident analysis platform, the driving metric output information and the one or more commands directing the accident analysis platform to cause display of the driving metric output interface based on the driving metric output information, wherein sending the driving metric output information and the one or more commands directing the accident analysis platform to cause display of the driving metric output interface based on the driving metric output information causes the accident analysis platform to cause display of the driving metric output interface based on the driving metric output information.

19. The one or more non-transitory computer-readable media of claim 18, wherein determining H comprises determining h based on information received from a vehicle attribute database.

* * * * *